(12) United States Patent
Wise

(10) Patent No.: US 10,356,077 B2
(45) Date of Patent: *Jul. 16, 2019

(54) AUTOMATED SEARCH RESULT ADAPTATION ACCORDING TO USER ACCOUNT INFORMATION

(71) Applicant: Samsung Electronics Co., Ltd., Suwon-si, Gyeonggi-do (KR)

(72) Inventor: Matthew Wise, Mountain View, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/627,154

(22) Filed: Jun. 19, 2017

(65) Prior Publication Data
US 2018/0013742 A1 Jan. 11, 2018

Related U.S. Application Data

(62) Division of application No. 14/826,454, filed on Aug. 14, 2015, now Pat. No. 9,686,263.

(51) Int. Cl.
| | |
|---|---|
| H04L 29/06 | (2006.01) |
| G06F 3/0482 | (2013.01) |
| G06F 16/248 | (2019.01) |
| G06F 16/2457 | (2019.01) |

(52) U.S. Cl.
CPC ............ *H04L 63/08* (2013.01); *G06F 3/0482* (2013.01); *G06F 16/248* (2019.01); *G06F 16/24578* (2019.01); *H04L 63/02* (2013.01); *H04L 63/102* (2013.01)

(58) Field of Classification Search
CPC . G06F 17/3053; H04L 63/02; H04L 63/0227; H04L 63/08
See application file for complete search history.

(56) References Cited

U.S. PATENT DOCUMENTS

| | | | | |
|---|---|---|---|---|
| 2012/0290441 | A1* | 11/2012 | Mahaniok | G06F 8/60 705/26.62 |
| 2014/0214898 | A1* | 7/2014 | Shapira | G06F 17/30864 707/771 |
| 2016/0085514 | A1* | 3/2016 | Savliwala | G06F 17/30867 705/14.69 |

* cited by examiner

*Primary Examiner* — Dao Q Ho
(74) *Attorney, Agent, or Firm* — Jefferson IP Law, LLP

(57) ABSTRACT

Techniques include receiving a search query from a user device, determining native applications that are installed on the user device and associated with user accounts, and identifying app state records based on the search query and the applications. Each app state record includes an application access mechanism (AAM) and application state information (ASI). The AAM references a native application and indicates operations for the application to perform. The ASI describes a state of the native application after the application has performed the operations. Identifying the app state records based on the native applications includes determining that each record includes an AAM that references one of the applications. The techniques also include selecting AAMs from the identified app state records and transmitting the AAMs to the user device. Other techniques include generating result scores for app state records identified based on the search query using the native applications.

4 Claims, 12 Drawing Sheets

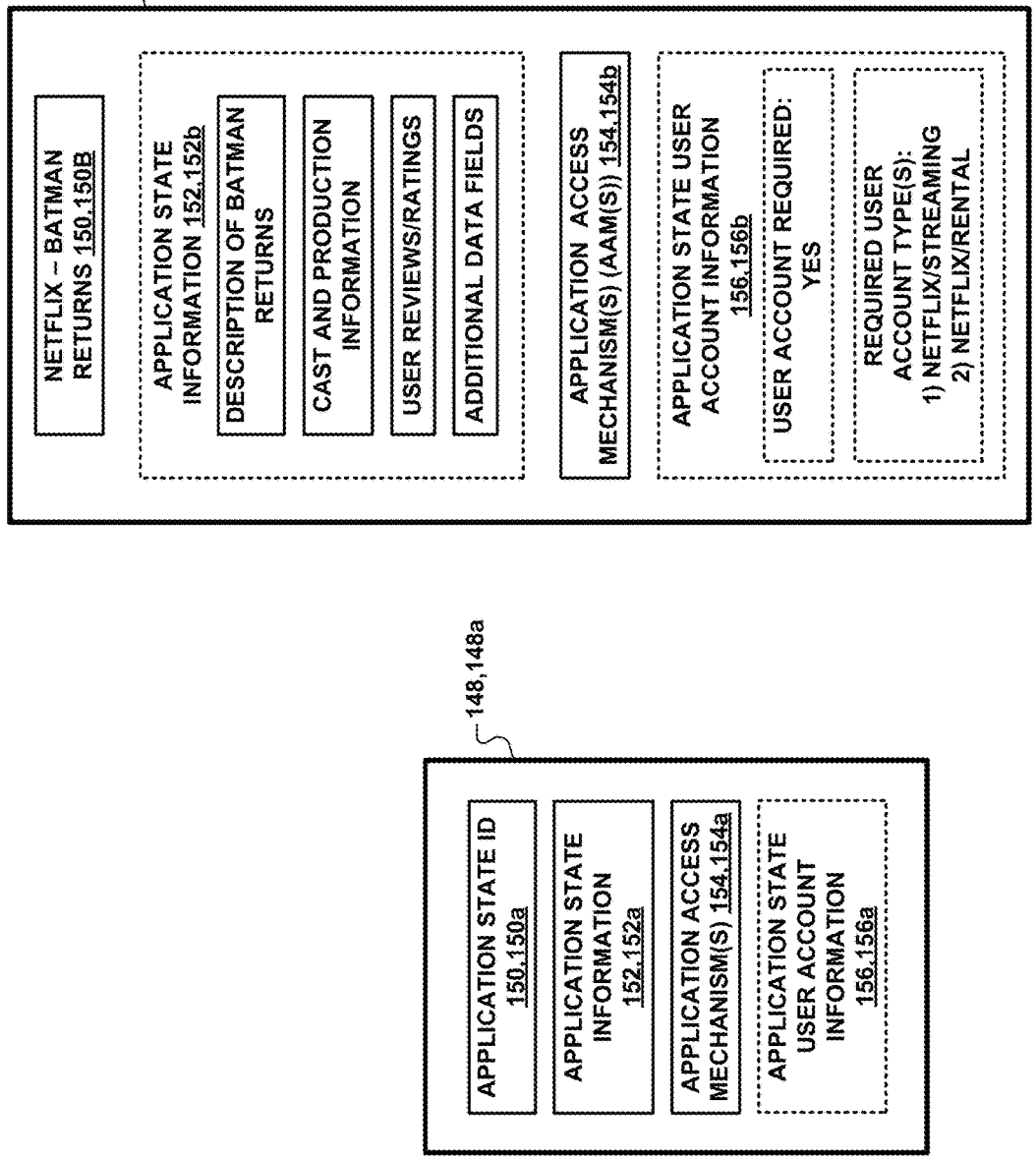

AUTOMATED SEARCH RESULT ADAPTATION ACCORDING TO USER ACCOUNT INFORMATION

CROSS-REFERENCE TO RELATED APPLICATIONS

This application is a divisional of U.S. patent application Ser. No. 14/826,454 (now U.S. Pat. No. 9,686,263) filed Aug. 14, 2015. The entire disclosure of the application referenced above is incorporated by reference.

FIELD

This disclosure generally relates to the field of search, and more particularly to techniques for generating search results that correspond to states within software applications.

BACKGROUND

In recent years, the use of computers, smartphones, and other Internet-connected computing devices has grown significantly. Correspondingly, the number of software applications (app) available for such computing devices has also grown. Today, many diverse software apps can be accessed on a number of different computing devices, including, but not limited to, smartphones, personal computers, automobiles, and televisions. These software apps can include business driven apps, games, educational apps, news apps, shopping apps, messaging apps, media streaming apps, and social networking apps, as some examples. Because of the large number of software apps available today and the wide range of functionality they provide, computing device users often require the ability to search for and access specific software app functionality.

SUMMARY

In one example, a method includes receiving a search query from a user device, determining one or more native applications (apps) that are each installed on the user device and associated with a user account, and identifying one or more app state records based on the search query and based on the one or more native apps. Each app state record includes an app access mechanism (AAM) and app state information (ASI). The AAM references a native app and indicates one or more operations for the native app to perform. The ASI describes a state of the native app after the native app has performed the one or more operations. In this example, identifying the one or more app state records based on the one or more native apps includes determining that the AAM included in each app state record references one of the one or more native apps. The method also includes selecting one or more AAMs from the identified one or more app state records and transmitting the selected one or more AAMs to the user device.

In another example, a method includes receiving a search query from a user device and identifying one or more app state records based on the search query. Each app state record includes an AAM and ASI. The AAM references a native app and indicates one or more operations for the native app to perform. The ASI describes a state of the native app after the native app has performed the one or more operations. The method further includes determining one or more native apps that are each installed on the user device and associated with a user account, generating one or more result scores for the identified one or more app state records based on the one or more native apps, and selecting one or more app state records from the identified one or more app state records based on the one or more result scores. The method also includes selecting one or more AAMs from the selected one or more app state records and transmitting the selected one or more AAMs to the user device.

In another example, a method includes transmitting, using a user device, a search query to a search system configured to generate search results in response to a received search query, and receiving search results from the search system at the user device in response to transmitting the search query. The search results include one or more AAMs that each reference a native app and indicate one or more operations for the native app to perform. The method also includes identifying, using the user device, one or more native apps that are each installed on the user device and associated with a user account, determining, using the user device, whether any of the one or more AAMs reference any of the one or more native apps, and displaying the one or more AAMs at the user device based on the determination.

In another example, a system includes one or more computing devices configured to receive a search query from a user device, determine one or more native apps that are each installed on the user device and associated with a user account, and identify one or more app state records based on the search query and based on the one or more native apps. Each app state record includes an AAM and ASI. The AAM references a native app and indicates one or more operations for the native app to perform. The ASI describes a state of the native app after the native app has performed the one or more operations. In this example, to identify the one or more app state records based on the one or more native apps, the one or more computing devices are configured to determine that the AAM included in each app state record references one of the one or more native apps. The one or more computing devices are also configured to select one or more AAMs from the identified one or more app state records and transmit the selected one or more AAMs to the user device.

In another example, a system includes one or more computing devices configured to receive a search query from a user device and identify one or more app state records based on the search query. Each app state record includes an AAM and ASI. The AAM references a native app and indicates one or more operations for the native app to perform. The ASI describes a state of the native app after the native app has performed the one or more operations. The one or more computing devices are further configured to determine one or more native apps that are each installed on the user device and associated with a user account, generate one or more result scores for the identified one or more app state records based on the one or more native apps, and select one or more app state records from the identified one or more app state records based on the one or more result scores. The one or more computing devices are also configured to select one or more AAMs from the selected one or more app state records and transmit the selected one or more AAMs to the user device.

In another example, a system includes one or more computing devices configured to transmit, using a user device, a search query to a search system configured to generate search results in response to a received search query, and receive search results from the search system at the user device in response to transmitting the search query. The search results include one or more AAMs that each reference a native app and indicate one or more operations for the native app to perform. The one or more computing devices are also configured to identify, using the user device, one or more native apps that are each installed on the user device and associated with a user account, determine, using the user device, whether any of the one or more AAMs reference any of the one or more native apps, and display the one or more AAMs at the user device based on the determination.

In another example, a non-transitory computer-readable storage medium includes instructions that cause one or more computing devices to receive a search query from a user device, determine one or more native apps that are each installed on the user device and associated with a user account, and identify one or more app state records based on the search query and based on the one or more native apps. Each app state record includes an AAM and ASI. The AAM references a native app and indicates one or more operations for the native app to perform. The ASI describes a state of the native app after the native app has performed the one or more operations. The instructions that cause the one or more computing devices to identify the one or more app state records based on the one or more native apps include instructions that cause the one or more computing devices to determine that the AAM included in each app state record references one of the one or more native apps. The instructions also cause the one or more computing devices to select one or more AAMs from the identified one or more app state records and transmit the selected one or more AAMs to the user device.

In another example, a non-transitory computer-readable storage medium includes instructions that cause one or more computing devices to receive a search query from a user device and identify one or more app state records based on the search query. Each app state record includes an AAM and ASI. The AAM references a native app and indicates one or more operations for the native app to perform. The ASI describes a state of the native app after the native app has performed the one or more operations. The instructions further cause the one or more computing devices to determine one or more native apps that are each installed on the user device and associated with a user account, generate one or more result scores for the identified one or more app state records based on the one or more native apps, and select one or more app state records from the identified one or more app state records based on the one or more result scores. The instructions also cause the one or more computing devices to select one or more AAMs from the selected one or more app state records and transmit the selected one or more AAMs to the user device.

In another example, a non-transitory computer-readable storage medium includes instructions that cause one or more computing devices to transmit, using a user device, a search query to a search system configured to generate search results in response to a received search query, and receive search results from the search system at the user device in response to transmitting the search query. The search results include one or more AAMs that each reference a native app and indicate one or more operations for the native app to perform. The instructions also cause the one or more computing devices to identify, using the user device, one or more native apps that are each installed on the user device and associated with a user account, determine, using the user device, whether any of the one or more AAMs reference any of the one or more native apps, and display the one or more AAMs at the user device based on the determination.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

FIGS. 5A-5B illustrate example app state records.

Like reference symbols in the various drawings indicate like elements.

DETAILED DESCRIPTION

Figure 1:
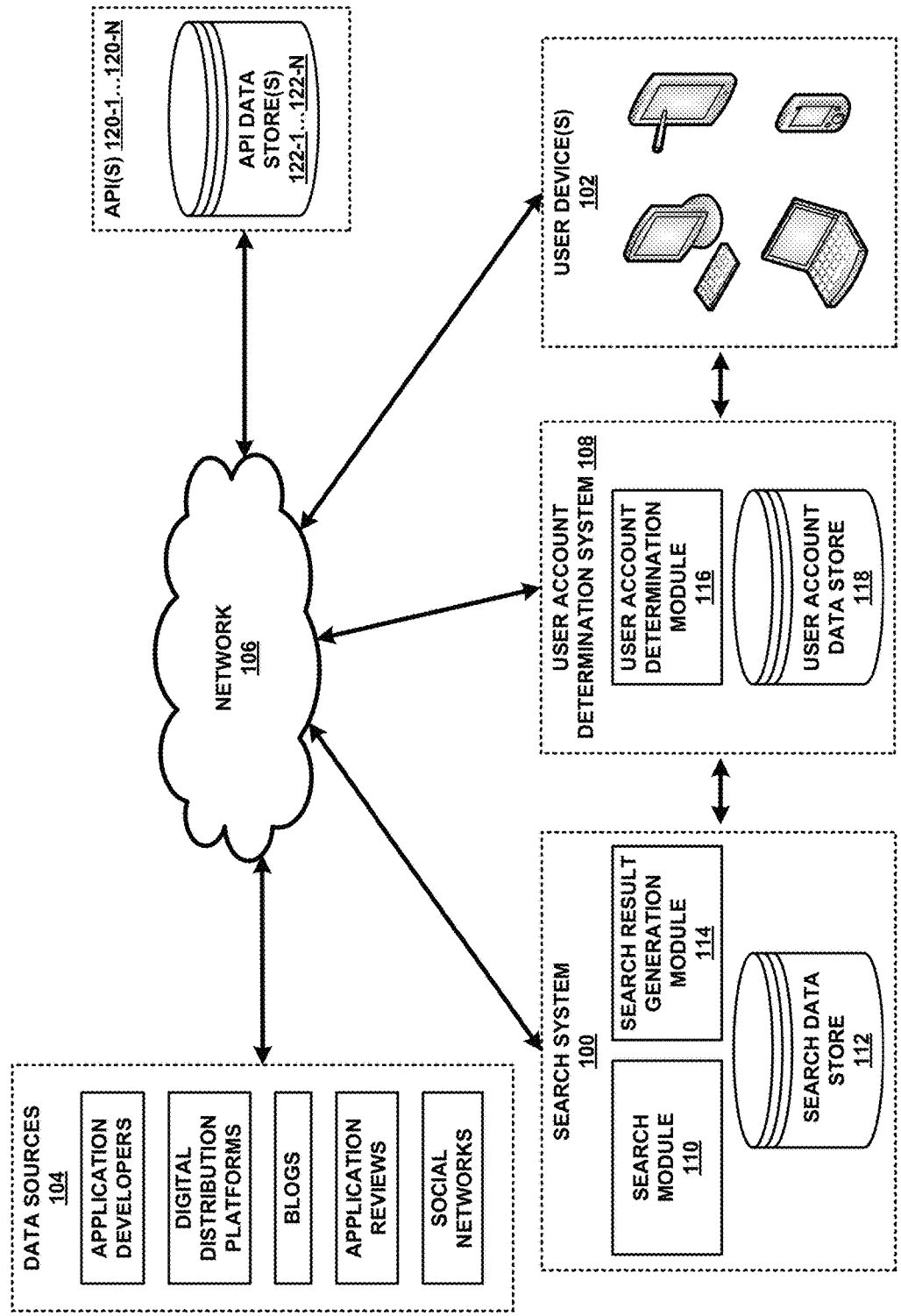
FIG. 1 illustrates an example environment that includes a search system, a user account determination system, one or more user devices, one or more data sources, and one or more application (app) programming interfaces (APIs) that communicate via a network.

The present disclosure generally relates to the field of search, and, more particularly, to techniques for generating and displaying search results at a computing device based on user accounts associated with software applications (apps) included on the device. Using the techniques described herein may, in some examples, improve search result relevance and enhance user experience. According to the disclosed techniques, a user device may include (e.g., have installed thereon) one or more native apps that are each associated with a user account. For example, the user accounts associated with the native apps may be associated with a user of the user device on which the apps are installed. In some examples, the user accounts grants the user access to one or more app states within the native apps that include various types of content (e.g., media). Consistent with the techniques, the user may input a search query (e.g., a text string) into a search field of a search app executing on the user device. The user may then cause the user device (e.g., the search app) to transmit the search query to a search system. The search system may receive the search query from the user device. In some examples, the search system further determines the native apps associated with the user accounts using any of a variety of techniques. As one example, the search system may receive an indication of the native apps (e.g., along with the search query, or separately) from the user device (e.g., via a data store). As another example, the search system may determine the native apps by interacting with other resources (e.g., app programming interfaces (APIs) associated with the apps) using information (e.g., user login credentials associated with the apps) received from the user device.

In these examples, upon receiving the search query from the user device and determining the native apps associated with the user accounts, the search system may generate one or more search results that each specify an app state within a native app based on the search query. The search system may then filter the search results based on the determined native apps (e.g., based on the associated user accounts). In particular, the search system may generate the search results such that each result is both responsive to (e.g., provides a function described by) the search query and specifies an app state within one of the native apps associated with the user accounts. In some examples, a user account associated with a native app grants a user access to only some app states within the app (e.g., in cases where the app may be associated with any of multiple different types of user accounts). In these examples, the search system may generate the search results by further determining that the app state specified by each result is accessible within the corresponding one of the native apps using the (e.g., particular type of the) associated user account. Alternatively, the search system may rank (e.g., order) the search results based on the native apps (e.g., based on the user accounts). Specifically, the search system may rank the search results based on whether each result specifies an app state within one of the native apps. In additional examples, the search system may rank each search result by further determining whether the app state specified by the result is accessible within the corresponding one of the native apps using the associated user account, in a similar manner as described above.

In any case, the search system may then transmit the filtered or ranked search results to the user device that generated the search query and on which the native apps associated with the user accounts are installed. The user device may receive the search results from the search system and display the results to the user (e.g., as one or more user selectable links). In some examples, the search system transmits additional data associated with one or more of the search results to the user device (e.g., along with the results). The user device may use the additional data as part of displaying the search results to indicate to the user (e.g., via text and/or image data) whether the user is able to access the corresponding one or more app states on the user device using any of the native apps associated with the user accounts.

In other examples, the search system may receive the search query from the user device and generate search results that are responsive to the search query, in a similar manner as described above. The search system may then transmit the search results to the user device. The user device may receive the search results from the search system. In these examples, the user device may further determine the native apps associated with the user accounts (e.g., using internal and/or external resources). The user device may then display the search results to the user (e.g., as one or more user selectable links) based on the determined native apps (e.g., based on the associated user accounts). As one example, the user device may filter the search results based on the native apps (e.g., display only those of the results that specify app states within the apps and are accessible using the user accounts), in a similar manner as described above with reference to the search system. As another example, the user device may rank the search results based on the native apps (e.g., order each result based on whether the result specifies an app state within any of the apps and is accessible using the user accounts), as also previously described with reference to the search system. In some examples, the user device displays the filtered or ranked search results such that at least one result indicates to the user (e.g., via text and/or image data) whether the user is able to access the corresponding app state on the user device using any of the native apps associated with the user accounts.

In the examples provided above, the user may select one or more of the filtered or ranked search results (e.g., one or more of the associated user selectable links) on the user device. Upon the user selecting a search result (e.g., an associated user selectable link), the user device may launch the corresponding native app and set the app into an app state specified by the selected result (e.g., by the selected link). The user may then interact with the app state on the user device (e.g., preview and/or perform a function provided by the app state).

In this manner, the techniques described herein may improve search result relevance and enhance user experience. As one example, by generating the search results using both the search query and the determination of the native apps associated with the user accounts, the techniques may improve search result relevance. For instance, the user obtaining (e.g., purchasing, or signing up for) the user accounts associated with the native apps may serve as valuable contextual data related to the user and the user's intent with respect to the search query. By identifying only app states that both match the search query and are associated with the native apps for which the user has obtained the user accounts, the search results may be more relevant to the user than search results generated using the search query alone. Additionally, by ranking app states identified using the search query such that app states associated with the native apps are ranked higher than other app states, those of the search results that are more relevant to the user may be displayed earlier than other search results. As another example, by limiting the search results to those that specify app states within the native apps or by ranking the search results based on the apps in the manner described above, the search results may be more readily accessible by the user at the user device, thereby enhancing the user's experience.

FIG. 1 is a functional block diagram that illustrates an example environment including a search system 100, a user account determination system 108, one or more user devices 102, one or more data sources 104, and one or more APIs 120 (e.g., servers) (e.g., API(s) 120-1 . . . 120-N) that communicate via a network 106. The network 106 through which the above-described systems, devices, and APIs communicate may include any type of network, such as a local area network (LAN), a wide area network (WAN), and/or the Internet. As shown in FIG. 1, the search system 100 includes a search module 110, a search result generation module 114, and a search data store 112, which are described in greater detail below. As further shown, the user account determination system 108 includes a user account determination module 116 and a user account data store 118, which are also described in greater detail below. In some examples, the user account determination system 108 is part of the search system 100, a part of any of the user device(s) 102, a part of another system or device, or a stand-alone system or device. As also shown, each of the API(s) 120 includes an API data store 122 (e.g., one of one or more API data stores 122-1 . . . 122-N), which are also described in greater detail below.

In the example of FIG. 1, the search system 100 receives a search query (e.g., a text string) from one of the user device(s) 102. As described herein, a user of the user device 102 may input the search query into the user device 102. In some examples, the search system 100 (e.g., the user account determination system 108) further determines one or more native apps that are each installed on the user device 102 and associated with a user account. As described herein, the user accounts associated with the native apps installed on the user device 102 may be associated with a user of the user device 102. As also described herein, the user accounts may grant the user access to one or more app states within the native apps that include various types of content (e.g., media). For example, the search system 100 may determine the native apps associated with the user accounts by receiving an indication of the apps from the user device 102 (e.g., directly, or via another system or device). The indication may be referred to herein as user account information. Alternatively, the search system 100 may determine the native apps by first receiving user login credentials (e.g., usernames and passwords) associated with the apps from the user device 102. The search system 100 may then query one or more APIs (e.g., one or more of the API(s) 120) associated with the native apps using the user login credentials. For example, the search system 100 may use the user login credentials to access or verify the user accounts associated with the native apps via the APIs. In response to querying the API(s), the search system 100 may determine the native apps associated with the user accounts. The determined native apps may also be referred to herein as user account information.

The search system 100 then generates one or more search results based on the search query and, e.g., based on the user account information. Specifically, the search system 100 generates the search results using information included in one or more app state records stored in the search data store 112. As described herein, each app state record may specify an app state of a native app. The information included in the app state records may include one or more app access mechanisms (AAMs) that enable the user device(s) 102 to access the app states specified by the records. The search system 100 transmits the AAMs included in the app state records to the user device 102 as the search results, as described herein. The information may also include app state information (ASI) (e.g., text) and other data (e.g., app state identifiers (IDs) and app state user account information) associated with the app state records, which the search system 100 may use to identify the records in the search data store 112, as also described herein. As explained in greater detail below, to generate the search results, the search system 100 may identify one or more app state records included in the search data store 112 based on the search query. In some examples, the search system 100 further filters the identified app state records based on the user account information (e.g., select only those of the records that specify app states within the native apps associated with the user accounts). In a specific example, the search system 100 may select only those of the identified app state records that specify app states that are accessible within the native apps using the (e.g., particular types of the) associated user accounts, as described herein. In other examples, the search system 100 may rank the identified app state records based on the user account information (e.g., generate a result score for each record based on whether the record specifies an app state within any of the native apps). In a specific example, the search system 100 may generate a result score for each identified app state record based on whether the app state specified by the record is accessible within any of the native apps using any of the associated user accounts, as also described herein.

The search system 100 then transmits the (e.g., filtered or ranked) search results, including one or more AAMs selected from the identified app state records, to the user device 102 that generated the search query. The user device 102 receives the search results, including the AAMs, from the search system 100 and displays the search results to the user as one or more user selectable links that include the AAMs. In implementations where the search results are not previously filtered or ranked based on the user account information as previously described, the user device 102 may filter or rank the search results (e.g., the user selectable links) using the user account information, in a similar manner as described above. In these examples, the user device 102 (e.g., the user account determination system 108) may initially determine the user account information, and then display the search results based on the information by filtering or ranking the search results (e.g., the user selectable links) as described above.

Figure 6B:
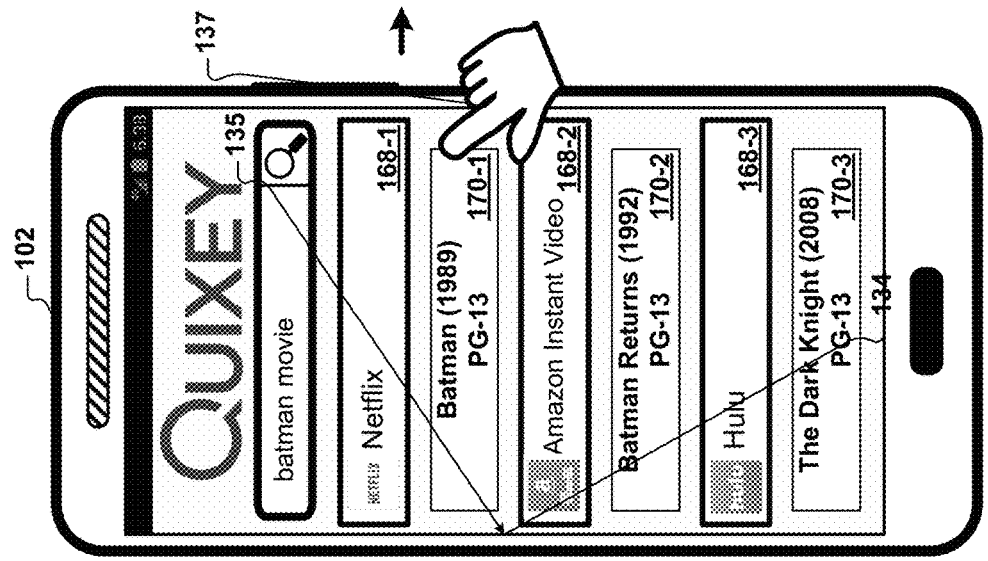
Figure 7C:
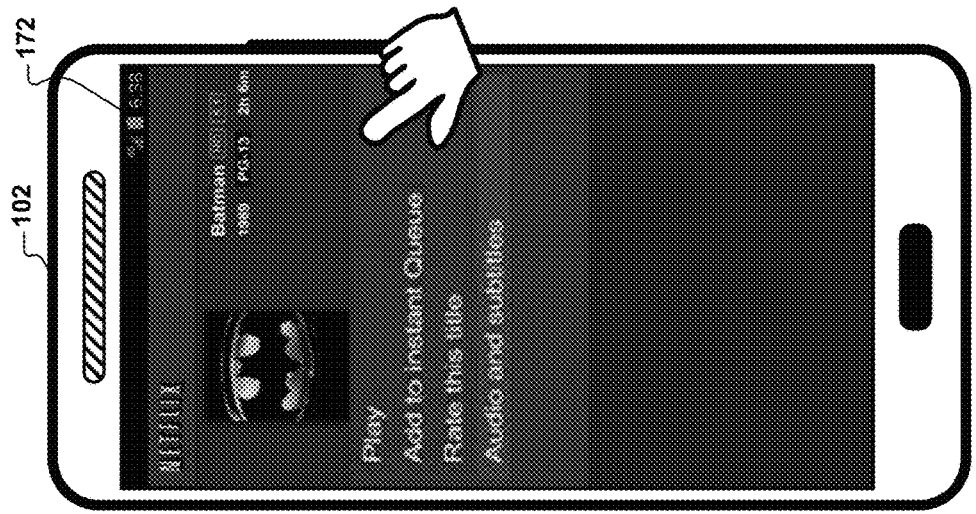
Figure 7B:
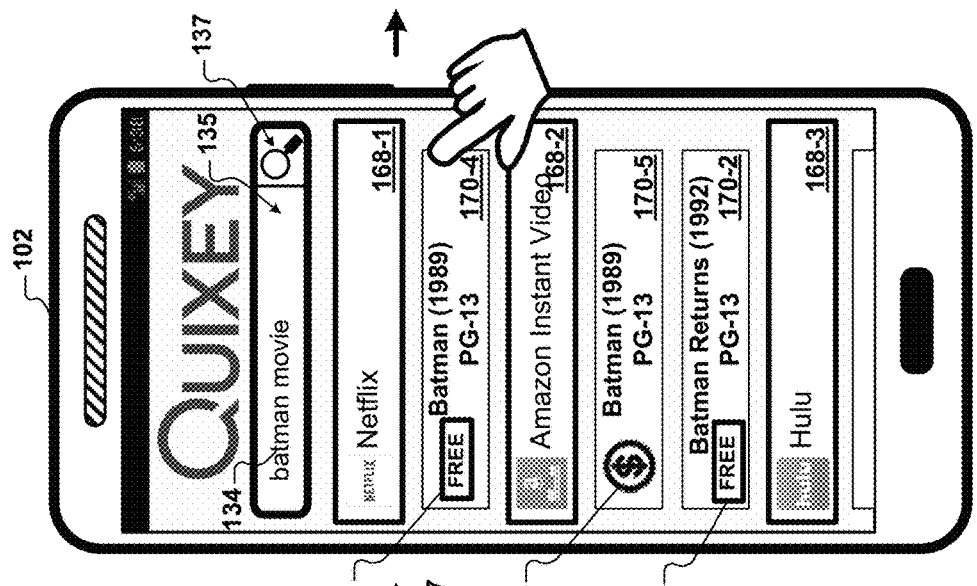

In some examples, the search system 100 transmits the search results, including the AAMs, to the user device 102 along with additional data. For example, the search system 100 may transmit link (e.g., text and/or image) data that the user device 102 may use to generate the user selectable links for the AAMs included in the search results. Each user selectable link may include text and/or image(s) that the user may select (e.g., touch, or "click on"). Each user selectable link may also be associated with one or more of the AAMs, such that when the user selects the link, the user device 102 launches a native app referenced by the corresponding AAM(s) and causes the app to perform one or more operations indicated by the AAM(s). The text and/or image(s) of the user selectable link may indicate the operations or function that the native app performs in response to selection of the link. In other words, the text and/or image(s) of the user selectable link may indicate an app state into which the native app is set upon performing the operations or function. For example, if the user selectable link is for a song in a native music player app, the text and/or image(s) may indicate that the user device 102 will launch the app and that the app will play the song when the user selects the link. Example user selectable links are shown in FIGS. 6B, 7B, and 8B.

In additional examples, the search system 100 may also transmit accessibility (e.g., text and/or image) data associated with one or more of the search results to the user device 102. The user device 102 may use the accessibility data to generate one or more of the user selectable links used to display the search results. For example, the accessibility data included in a particular user selectable link may indicate to the user whether the app state specified by the link (e.g., by the corresponding search result) is accessible on the user device 102 via any of the native apps associated with the user accounts. In other examples, the user device 102 may generate the accessibility data locally (e.g., by interacting with one or more other resources). Example user selectable links that include accessibility data are shown in FIG. 8B.

In this disclosure, an app may refer to computer software that causes a computing device (e.g., one of the user device(s) 102) to perform a task. In some examples, an app is referred to as a "program." Example apps include word processing apps, spreadsheet apps, messaging apps, media streaming apps, social networking apps, and games. Apps can be executed on a variety of different computing devices, including mobile computing devices, such as smart phones, tablets, and wearable computing devices (e.g., headsets and/or smart watches). Apps can also be executed on other types of computing devices having other form factors, such as laptop computers, desktop computers, or other consumer electronic devices. In some examples, apps are installed on a computing device prior to a user purchasing the device. In other examples, the user may download and install apps on the computing device after purchasing the device. A native app, as used herein, may refer to an app that is installed and executed on a user device 102. In contrast, a web-based app may refer to an app that is accessible from a user device 102 via a web browser app included on the user device 102.

An AAM, as used herein, may be a string of one or more characters that references a native app and indicates one or more operations for a user device 102 (e.g., the app) to perform. If a user of the user device 102 selects a user selectable link that includes the AAM, the user device 102 may launch the native app referenced by the AAM and (e.g., cause the app to) perform the operations indicated by the AAM. In other words, the user selecting the user selectable link may cause the user device 102 to launch the native app and set the app into an app state (e.g., in which the app displays a GUI, or screen) that corresponds to the operations. As a result, the native app may be configured to display one or more products, services, or vendors, to the user, e.g., via a display device of the user device 102. In this manner, the AAM may specify the app state of the native app. The app state, in turn, may refer to the operations indicated by the AAM and/or the outcome of the native app performing the operations in response to the user selecting the user selectable link that includes the AAM on the user device 102.

An app state of a native app, as also used herein, may refer to one or more graphical user interfaces (GUIs), or so-called "screens," within the app. In general, an app state of this disclosure may refer to a configuration of a native app in which the app displays content to a user, such as information related to one or more products, services, or vendors provided by, or accessible via, the app. An app state may also refer to a function provided by a native app. For example, an app state of native online shopping app may correspond to a screen of the app that describes (e.g., using text and/or image data) a particular product or service sold through the app (e.g., by one or more vendors associated with the app).

As described herein, the search system 100 uses data included in the search data store 112 to generate search results based on search queries received from the user device(s) 102 and, e.g., based on user account information determined by the search system 100. The search data store 112 may include one or more databases, indices (e.g., inverted indices), tables, files, or other data structures that may be used to implement the techniques of the present disclosure. In some examples, the search data store 112 is included in one or more storage devices. The search data store 112 includes one or more app state records (e.g., as shown in FIG. 5A). Each app state record may include data related to a function of a native app and/or to an app state of the app resulting from the app performing the function. For example, each app state record may include, among other content, an app state ID, ASI, and one or more AAMs. An app state ID of an app state record may uniquely identify the record among other app state records included in the search data store 112. ASI of an app state record may describe an app state into which an app is set according to one or more AAMs included in the record. An AAM of an app state record may include data (e.g., a text/number string) that causes a user device 102 to launch a native app and perform a function associated with the app. As described below, in some examples, an app state record also includes app state user account information that indicates one or more user accounts required by a user device 102 to access an app state specified by the record within a corresponding native app. Example app state records are shown in FIGS. 5A and 5B.

As described herein, the search system 100 receives the search query from the user device 102 and generates the search results based on the search query and, e.g., based on the user account information. The search query may include text, numbers, and/or symbols (e.g., punctuation) entered into the user device 102 by the user. For example, the user may have entered the search query into a search field, or "box," of a search app included on the user device 102. The user may have entered the search query using a touchscreen keypad, a mechanical keypad, and/or via speech recognition techniques and transmitted the search query to the search system 100 using the search app. In some examples, the user device 102 (e.g., the search app) also determines the user account information and transmit the information to the search system 100, as described herein. For example, the user device 102 (e.g., the search app) may transmit the user account information to the search system 100 along with the search query (e.g., as part of a query wrapper). In some examples, the search app is a native app dedicated to search, or a more general app, such as a web browser app. In other examples, the search system 100 may determine the user account information (e.g., using data received from the user device 102, or independently of the user device 102), as also described herein. The user account information may include any of text, numbers, and/or symbols (e.g., punctuation), as well as any machine-readable (e.g., binary) data used to represent the native apps installed on the user device 102 and associated with the user accounts, as further described herein.

In some examples, the user device 102 transmits additional data to the search system 100 along with the search query and, e.g., the user account information. The search query and any additional data may be referred to herein as a query wrapper. The additional data may include geolocation data associated with the user device 102, platform data for the user device 102 (e.g., a type and/or a version of the user device 102, an operating system (OS), and/or a web browser app of the user device 102), an identity of the user (e.g., a username), partner specific data, and/or other data. The user device 102 may transmit the query wrapper to the search system 100. The search system 100 may receive the query wrapper and use the search query and, e.g., the additional data to generate the search results in the manner described herein.

The user device(s) 102 may be any computing devices capable of providing search queries and, e.g., user account information, to the search system 100 (and, e.g., the user account determination system 108) and receiving search results from the search system 100. The user device(s) 102 may include any of smart phones, and tablet, laptop, or desktop computers. The user device(s) 102 may also include any computing devices having other form factors, e.g., computing devices included in vehicles, gaming devices, televisions, or other appliances (e.g., networked home automation devices and home appliances). The user device(s) 102 may use a variety of different operating systems or platforms. In an example where a user device 102 is a mobile device, the user device 102 may operate using an OS, such as ANDROID® by Google, Inc., IOS® by Apple, Inc., or WINDOWS PHONE® by Microsoft Corporation. In an example where the user device 102 is a laptop or desktop computing device, the user device 102 may use an OS, such as MICROSOFT WINDOWS® by Microsoft Corporation, MAC OS® by Apple, Inc., or LINUX® (LINUX® is the registered trademark of Linus Torvalds in the U.S. and other countries). The user device(s) 102 may interact with any of the systems 100, 108 using operating systems other than those described herein, whether presently available or developed in the future.

The user device(s) 102 can communicate with the search system 100 (and, e.g., the user account determination system 108) via the network 106. In general, the user device(s) 102 may communicate with any of the systems 100, 108 using any app that can transmit search queries and, e.g., user account information, to one or more of the systems 100, 108, and receive search results from the search system 100. In some examples, the user device(s) 102 include an app that is dedicated to interfacing with one or more of the systems 100, 108, such as an app dedicated to searches (e.g., a search app). In other examples, the user device(s) 102 may communicate with any of the systems 100, 108 using a more general app, such as a web browser app. In any case, an app included on a user device 102 to communicate with one or more of the systems 100, 108 may include a GUI with a search field, or box, into which a user of the user device 102 may enter search queries. For example, the user may enter the search queries using a touchscreen, a physical keyboard, a speech-to-text program, or another form of user input available on the user device 102. The app may be configured to transmit the search queries to the search system 100 (e.g., in response to user inputs). The same app may also be configured to determine (e.g., via a user account determination module) native apps that are each installed on the user device 102 and associated with a user account, as described herein. In other examples, the app may be further configured to transmit indications of this user account information to one or more of the systems 100, 108 (e.g., along with the search queries), as also described herein.

In some examples, the user device 102 uses the same (e.g., dedicated or more general) app to display the search results received from the search system 100 to the user. For example, the user device 102 may display the search results via the GUI used to receive the search queries from the user and transmit the search queries to one or more of the systems 100, 108, as described herein. The GUI may display the search results to the user in a variety of different ways, depending on the information transmitted by the search system 100 to the user device 102 as part of the search results. As previously described, the search results may include one or more AAMs along with result scores, link data, and/or other information (e.g. accessibility data) used to generate user selectable links for the AAMs. The GUI may display the search results to the user as a list of the user selectable links, including text and/or images. For instance, the text and/or images may include names of native apps referenced by the AAMs, descriptions of the AAMs and/or operations indicated therein (e.g., descriptions of the app states specified by the AAMs), and images associated with the apps or the app states specified by the AAMs (e.g., app, or app state, icons or "screens"). Additionally, for some or all of the user selectable links, the text and/or images may also indicate whether the user is able to access the corresponding app state(s) given the user account information (e.g., using the user accounts associated with the native apps that are installed on the user device 102), as described herein. In additional examples, the GUI may display the search results as the list of the user selectable links arranged under a search field, or box, into which the user entered a search query. For example, the GUI may arrange the user selectable links by result scores associated with the links, i.e., with the AAMs for which the links are generated, or using other logic. In still other examples, the GUI may also group the user selectable links by the associated apps (e.g., using app headers).

The data source(s) 104 may be sources of data that the search system 100 may use to generate and/or update the search data store 112. For example, the search system 100 may use the data source(s) 104 to generate and/or update one or more databases, indices, tables, files, or other data structures (e.g., app state records) included in the search data store 112. As an example, the search system 100 may generate new app state records and/or update existing app state records based on data retrieved from the data source(s) 104. For instance, the search system 100 may include modules that generate new app state records and/or update existing app state records based on the data. In some examples, some or all of the data included in the search data store 112 (e.g., one or more app state records) is manually generated by a human operator.

The data source(s) 104 may include a variety of different data providers. For example, the data source(s) 104 may include data from app developers, such as app developer websites and data feeds provided by app developers. The data source(s) 104 may also include operators of digital distribution platforms configured to distribute apps to user devices. The data source(s) 104 may further include other websites, such as websites that include web logs (i.e., blogs), app reviews, or other data related to apps. Additionally, the data source(s) 104 may include social networking sites, such as "FACEBOOK®" by Facebook, Inc. (e.g., Facebook posts) and "TWITTER®" by Twitter, Inc. (e.g., text from tweets). The data source(s) 104 may also include online databases that include data related to movies, television programs, music, and restaurants. The data source(s) 104 may further include other types of data sources, which may have various types of content and update rates. In some examples, the search system 100 retrieves data from the data source(s) 104, including any type of data related to app functionality and/or app states. The search system 100 may then generate one or more app state records based on the data and store the records in the search data store 112. In other examples, some or all of the data (e.g., ASI) included in the app state records of the search data store 112 may be manually generated by a human operator. Additionally, in some examples, the data included in the app state records is updated over time so that the search system 100 provides up-to-date search results in response to user-specified search queries received from the user device(s) 102.

Figure 2:
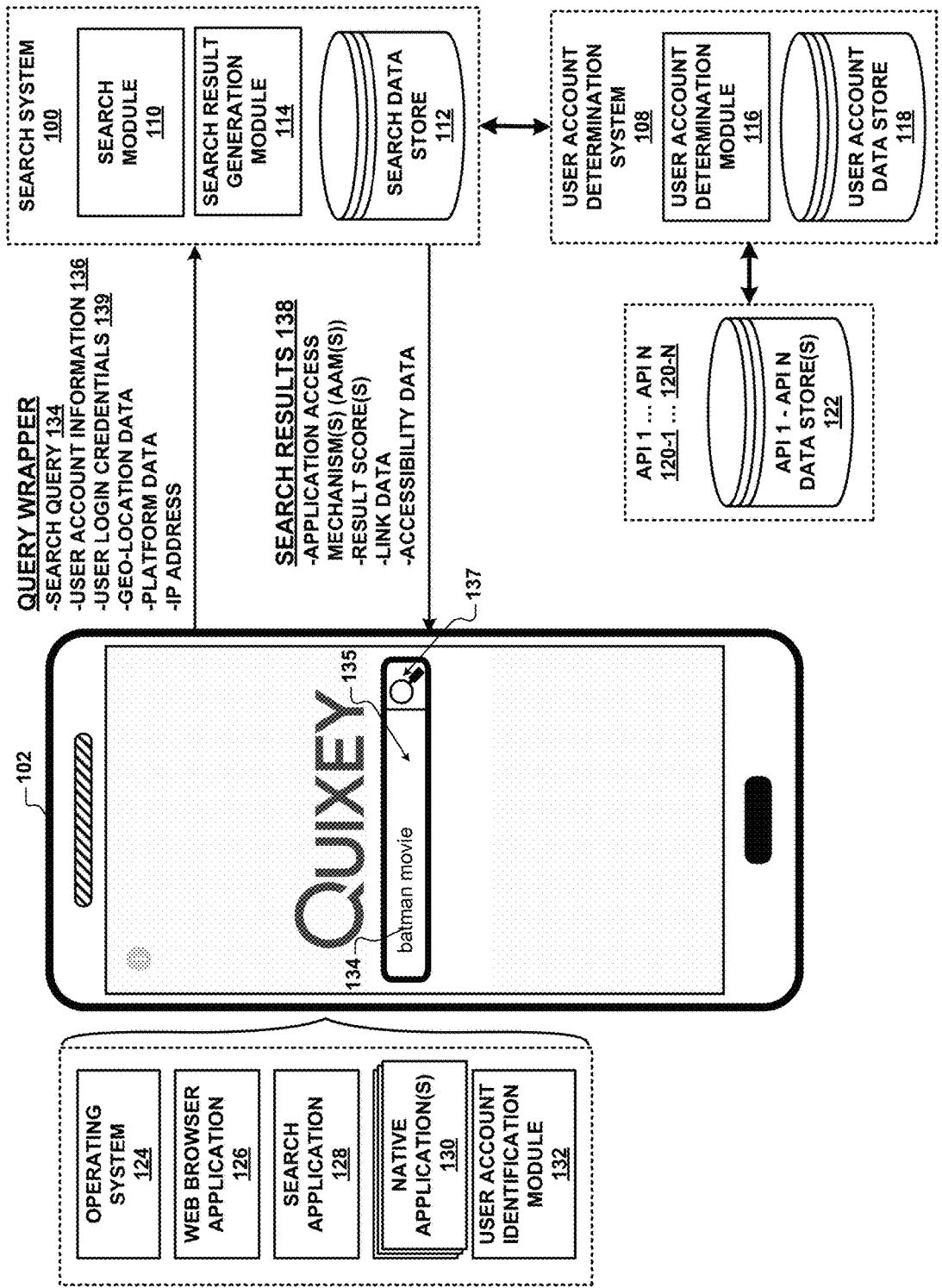
FIG. 2 illustrates an example of a user device in communication with a search system and a user account determination system.

FIG. 2 illustrates an example of one of the user device(s) 102 in communication with the search system 100 and the user account determination system 108. Specifically, FIG. 2 depicts example interactions and data exchanged among the user device 102, the search system 100, and the user account determination system 108. As shown in FIG. 2, the user device 102 may transmit a query wrapper to the search system 100. The query wrapper may include a search query (e.g., a text string, such as "batman movie") 134 specified by a user of the user device 102. As described herein, the user may have entered the search query 134 into a search field 135 of a GUI of a search app 128 included on the user device 102. As explained herein, the search app 128 may be a native app (e.g., any of one or more native apps 130), or a web-based app (e.g., accessible via a web browser app 126) included on the user device 102. The user may have then submitted the search query 134 to the search system 100 (i.e., as part of the query wrapper) by selecting a search button 137 of the GUI. As further shown, the query wrapper may include additional information, such as any of geolocation data, platform data, and other data (e.g., an IP address) associated with the user, the user device 102, and/or the search query 134. In the example of FIG. 2, the query wrapper may also include an indication of one or more native apps (e.g., any of the native app(s) 130) that are each installed on the user device 102 and associated with a user account. The indication of the native apps associated with the user accounts may be referred to herein as user account information 136. In this example, the user device 102 (e.g. the search app 128) may have determined the native apps using a user account identification module 132 also included on the user device 102 (e.g., as part of the search app 128). As one example, the user account identification module 132 may have determined the native apps by detecting the user logging into the apps on the user device 102 using user login credentials (e.g., user names and passwords). As another example, the user account identification module 132 may have determined the native apps by polling an OS 124 of the user device 102, or accessing another resource (e.g., a data store) outside of the user device 102. In some examples, the user device 102 (e.g., the user account identification module 132) determines the native apps prior to, during (e.g., in response to), or following the user entering and/or submitting the search query 134 using the search app 128, as described above.

In other examples, instead of receiving the user account information 136 from the user device 102, the search system 100 may determine the native apps associated with the user accounts (i.e., the user account information 136). As one example, the search system 100 may initially receive user login credentials 139 associated with the native apps from the user device 102. The search system 100 may then determine the native apps by interacting (e.g., via the user account determination system 108) with one or more APIs (e.g., any of the API(s) 120-1 . . . 120-N) associated with the apps using the user login credentials 139. For example, the search system 100 may query the APIs using the user login credentials 139 to access or verify the user accounts associated with the native apps. As another example, the search system 100 may retrieve the user account information 136 from a storage location (e.g., a data store). In this example, the user device 102 may have transmitted the user account information 136 to the storage location.

In any case, upon receiving the query wrapper from the user device 102, the search system 100, e.g., in conjunction with the user account determination system 108, may generate one or more search results 138 based on the search query 134 and the user account information 136. As described herein, to generate the search results 138, the search system 100 may identify one or more app state records included in the search data store 112 based on the search query 134, and then filter or rank the identified records using the user account information 136. As also described herein, the search system 100 may further generate results scores for the identified app state records (e.g., as part of ranking the records using the user account information 136). The search system 100 may then transmit the search results 138 to the user device 102. As shown in FIG. 2, the search results 138 may include one or more AAMs selected from the filtered or ranked app state records, as well as one or more result scores, link data, and/or other information (e.g., accessibility data) associated with the AAMs (e.g., the records).

In the example of FIG. 2, upon receiving the search results 138 from the search system 100, the user device 102 may display the search results 138 to the user as one or more user selectable links. For example, the user device 102 may generate the user selectable links such that each link is associated with (e.g., includes) one or more of the AAMs included in the search results 138. As described herein, each AAM included in the search results 138 may specify a state of a native app. As a result, when the user selects (e.g., touches, or clicks on) each user selectable link, the user device 102 may launch the corresponding native app and set the app into an app state specified by the AAM. In these examples, the user device 102 may generate the user selectable links using the link data also included in the search results 138. For example, the link data may include any of text (e.g., describing a name of a native app and/or an app state) and image data (e.g., an icon for the app, or app state). In this manner, the link data included in (e.g., used to generate) each user selectable link may describe the native app and/or app state associated with the link. The user device 102 may also generate one or more of the user selectable links to include the accessibility data also received as part of the search results 138. As described herein, the accessibility data included in each user selectable link may indicate to the user whether the app state specified by the link (e.g., by the corresponding one of the search results 138) is accessible on the user device 102 via any of the native apps associated with the user accounts (i.e., given the user account information 136). The user device 102 may further arrange (e.g., order, or rank) the user selectable links as part of displaying the links to the user based on the result scores also included in the search results 138. For example, the user device 102 may assign each user selectable link the result score associated with the app state record from which the AAM included in the link was selected. The user device 102 may then order the user selectable links based on the result scores (e.g., display higher-ranking links higher within a list of user selectable links). Example search results 138 displayed on a user device 102 as user selectable links are described below with reference to FIGS. 6A-8C.

Figure 3A:
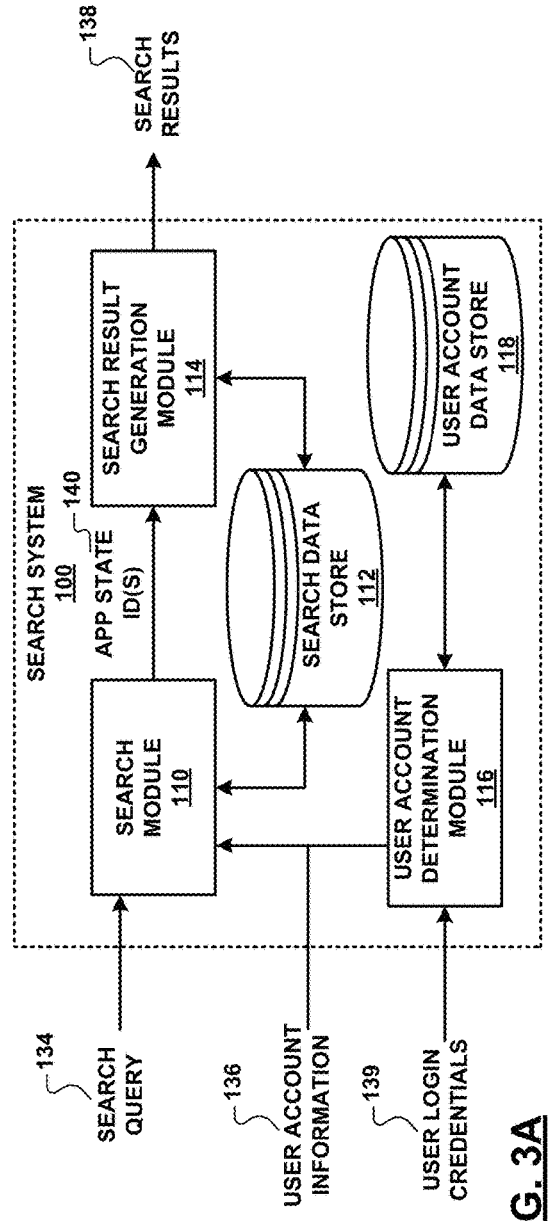
FIG. 3A is a functional block diagram of an example search system.

FIG. 3A illustrates an example of the search system 100 and the user account determination system 108. As described herein, the search system 100 generates search results 138 using a search query 134 received from one of the user device(s) 102, data (e.g., app state records) included in the data store 112, and, in some examples, user account information 136 determined by the search system 100. Specifically, the search module 110 identifies one or more app state records included in the search data store 112 based on the search query 134 and, e.g., based on the user account information 136. The search module 110 further ranks the identified app state records, e.g., also based on the user account information 136. In some examples, the search module 110 identifies and/or ranks the app state records based on the user account information 136 using the user account determination system 108, as described below. The search module 110 then transmits one or more app state IDs 140 that identify the identified app state records to the search result generation module 114. The search result generation module 114 receives the app state IDs 140 from the search module 110, identifies the app state records in the search data store 112 using the app state IDs 140, and selects one or more AAMs from the identified records. The search result generation module 114 then transmits the selected AAMs to the user device 102 as the search results 138 (e.g., along with result scores, link data, and/or accessibility data).

As shown in FIG. 3A, in examples where the search system 100 generates the search results 138 based on the user account information 136, the search module 110 may receive the information 136 from the user device 102 and identify or rank the app state records in the manner described herein using the information 136. In some examples, however, the user account determination module 116 and/or the user account data store 118 performs some or all of the functions associated with the search system 100 determining the user account information 136 and identifying or ranking the app state records using the information 136. For example, as also shown, the user account determination module 116 may determine the user account information 136 (e.g., by querying APIs using user login credentials 139 received from the user device 102, as described herein) and transmit the information 136 to the search module 110. In some examples, the user account determination module 116 determines the user account information 136 using data included in the user account data store 118 and/or store the information in the user account data store 118. In any case, the search module 110 may receive the user account information 136 from the user account determination module 116 and identify or rank the app state records using the information 136 as described above.

In some examples, the search module 110 identifies the app state records using the information 136 by determining that each record includes an AAM that references one of the native apps associated with the user accounts, as indicated by the user account information 136. In other examples, the search module 110 may identify the app state records by determining that each record includes an app state ID and/or ASI that describes (e.g., references by name) one of the native apps. In still other examples, one or more app state records included in the search data store 112 may each include app state user account information that indicates a user account (e.g., a user account type) required by a user device 102 to access an app state specified by the record within a corresponding native app (e.g., as shown in FIG. 5A). In these examples, the search module 110 may identify the app state records based on one or more (e.g., text) matches between the user account information 136 and the app state user account information indicated by the identified records. For example, the search module 110 may identify each app state record based on a match between one of the native apps, one of the associated user accounts, and/or one of the user account types thereof, as specified by the user account information 136, and a term (e.g., text) indicated by the app state user account information included in the record.

Figure 3B:
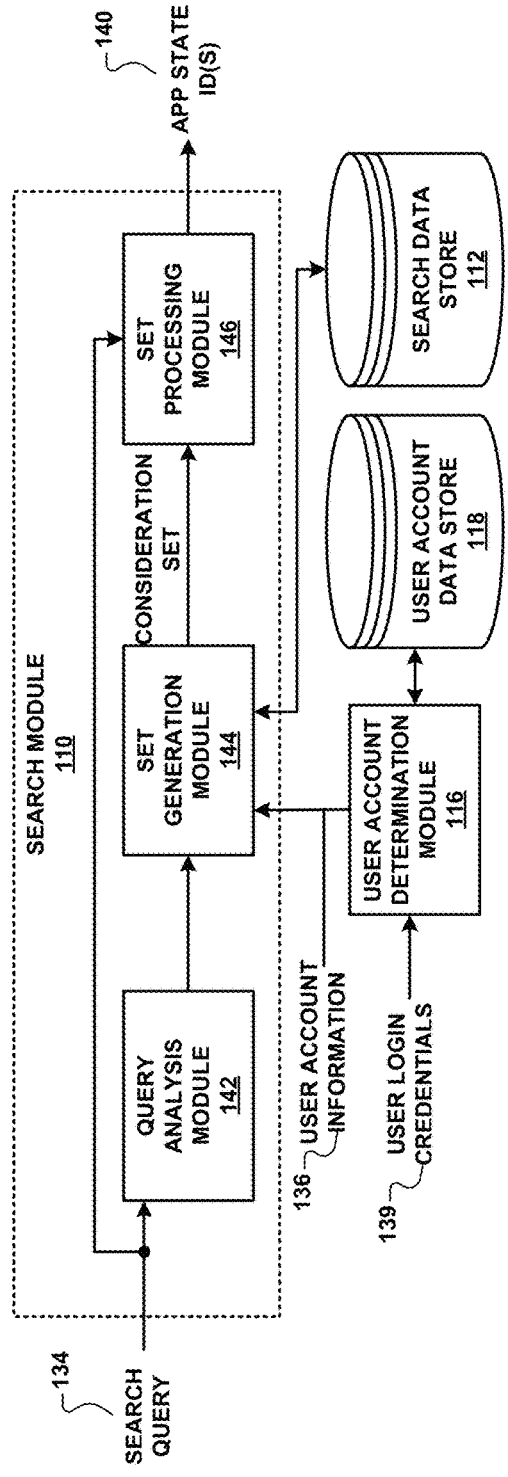
FIG. 3B is a functional block diagram of an example search module.

FIG. 3B illustrates an example of the search module 110, the search data store 112, the user account determination module 116, and the user account data store 118. The search module 110 of FIG. 3B includes a query analysis module 142, a consideration set generation module (hereinafter, "set generation module") 144, and a consideration set processing module (hereinafter, "set processing module") 146. The query analysis module 142 receives a search query 134 from one of the user device(s) 102 (e.g., as part of a query wrapper) and analyzes the query 134 (e.g., performs any of tokenization, filtering, stemming, synonymization, and stop word removal with respect to the query 134). The set generation module 144 identifies one or more app state records included in the search data store 112 based on the (e.g., analyzed) search query 134 and, e.g., based on user account information 136, as described herein. As shown in FIG. 3B, the set generation module 144 may receive the user account information 136 directly from the user device 102, or from the user account determination module 116. As an example, the set generation module 144 may identify the app state records using the search query 134 and, e.g., the user account information 136, as inputs to Lucene® information retrieval software developed by the Apache Software Foundation. For example, the set generation module 144 may identify the app state records based on one or more (e.g., text) matches between one or more terms of the search query 134 and one or more terms of information (e.g., app state IDs and/or ASI) included in the records. In some examples, the set generation module 144 further identifies the app state records based on one or more matches between the user account information 136 (e.g., one or more indications of native apps, user accounts, and/or user account types associated therewith) and information (e.g., app state IDs, ASI, AAMs, and app state user account information) indicated in or associated with the records, as also described herein. The identified app state records may be referred to as a "consideration set." The set processing module 146 may process (e.g., score and select a subset of) the consideration set (e.g., generate result scores for the identified app state records based on the user account information 136 and select a subset of the records based on the scores). The set processing module 146 may then generate one or more app state IDs that identify some or all of the (e.g., scored) app state records, and transmit the IDs to the search result generation module 114, as described above.

The information conveyed by the search results 138 may depend on the manner in which the set processing module 146 generates the result scores for the app state records. For example, for each app state record, the corresponding result score may indicate the relevance of the app state or function specified by the record to the search query 134, the popularity of the app state or function, or other properties of the app state or function, depending on the one or more parameters the set processing module 146 uses to score the app state records. The set processing module 146 may generate the result scores for the app state records in a variety of different ways. In some examples, the set processing module 146 generates a result score for an app state record based on one or more scoring features. The scoring features may be associated with the app state record and/or the search query 134. An app state record scoring feature (hereinafter, "record scoring feature") may be based on any data associated with an app state record. For example, a record scoring feature may be based on any data included in ASI of an app state record. Example record scoring features may be a quality score and whether the app state record includes an AAM that specifies a default app state (e.g., a main page of a native app) or a deeper app state. A query scoring feature may include any data associated with the search query 134. For example, a query scoring feature may include a number of words in the search query 134, popularity of the search query 134, and an expected frequency of the words in the search query 134. A record-query scoring feature may include any data that may be generated based on data associated with both an app state record and the search query 134 that resulted in identification of the record by the set generation module 144. For example, record-query scoring features may include parameters that indicate how well terms of the search query 134 match terms of ASI of the identified app state record. In some examples, as described herein, the set processing module 146 generates a result score for an app state record based on the user account information 136. In these examples, a user account scoring feature may include any data associated with the user account information 136 (e.g., an indication of one or more native apps that are installed on the user device 102 and associated with user accounts, the user accounts, and/or their types). As described herein, the set processing module 146 may generate a result score for an app state record based on whether the record specifies an app state within any of the native apps indicated by the user account information 136 (e.g., based on whether the app state is accessible within any of the native apps using any of the associated user accounts). According to the disclosed techniques, the set processing module 146 may generate a result score for an app state record based on at least one of the record scoring features, query scoring features, record-query scoring features, user account scoring features, and/or additional scoring features not explicitly listed.

In some examples, the set processing module 146 includes one or more machine-learned models (e.g., a supervised learning model) configured to receive one or more scoring features. The machine-learned models may generate one or more result scores based on at least one of the record, query, record-query, and user account scoring features described above. For example, the set processing module 146 may pair the search query 134 with each app state record and calculate a vector of features for each (query, record) pair. The vector of features may include one or more record, query, record-query, and user account scoring features. The set processing module 146 may then input the vector of features into a machine-learned regression model to calculate a result score for the app state record. In some examples, the machine-learned regression model includes a set of decision trees (e.g., gradient boosted decision trees). In other examples, the machine-learned model may be trained by a simple form of logistic regression. In still other examples, the machine-learned task described above can be framed as a semi-supervised learning task, where a minority of the training data is labeled with human curated result scores and the rest of the data is used without such labels.

As described herein, the result scores associated with the app state records (e.g., the AAMs included therein) may be used in a variety of different ways. In some examples, the result scores are used to rank (e.g., order) the AAMs within a list. In these examples, a higher result score may indicate that the corresponding AAM (e.g., app state) is more relevant to the user than an AAM having a smaller result score. In examples where the search results 138 are displayed as a list of user selectable links on the user device 102, the links including AAMs associated with larger result scores may be listed closer to the top of the list (e.g., near to the top of the screen). In these examples, links including AAMs having lower result scores may be located farther down the list (e.g., off screen) and may be accessed by scrolling down the screen of the user device 102. In some examples, as shown in FIGS. 6B, 7B, and 8B described below, the user device 102 groups user selectable links associated with the same native app.

Figure 4:
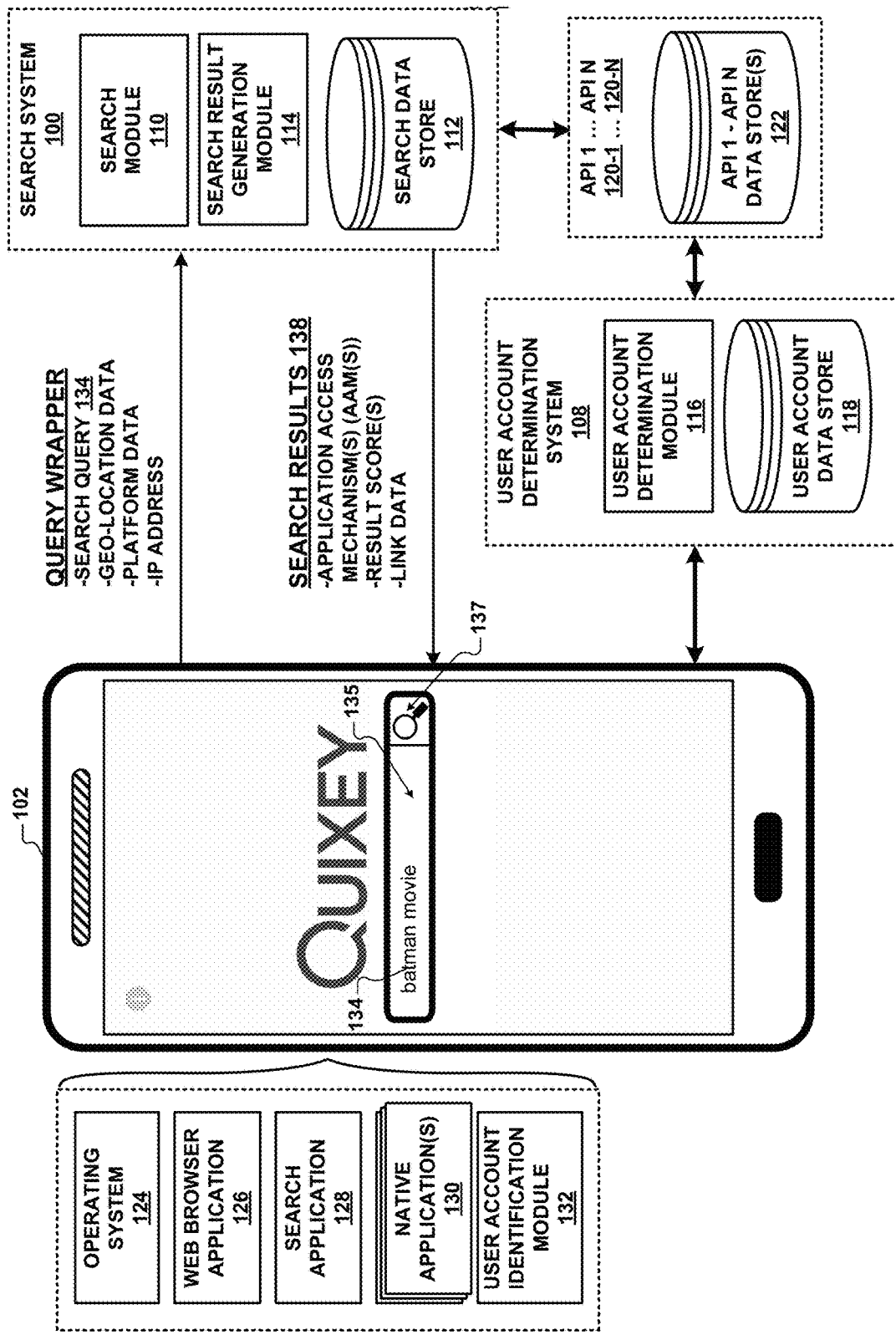
FIG. 4 illustrates another example of a user device in communication with a search system and a user account determination system.

FIG. 4 illustrates another example of one of the user device(s) 102 in communication with the search system 100 and the user account determination system 108. The example of FIG. 4 includes some of the features described above with reference to FIG. 2. In the example of FIG. 4, the user device 102 may transmit a query wrapper including a search query 134 and additional information (e.g., geo-location, platform, and/or IP address data) to the search system 100, in a similar manner as described above. Upon receiving the query wrapper from the user device 102, the search system 100 may generate one or more search results 138 based on the search query 134. As described herein, the search system 100 may identify one or more app state records included in the search data store 112 based on the search query 134. As also described herein, the search system 100 may further generate results scores for (e.g., rank) the identified app records. The search system 100 may then transmit the search results 138 to the user device 102. As shown in FIG. 4, the search results 138 may include one or more AAMs selected from the identified (e.g., ranked) app state records, one or more result scores, link data, and/or other data.

In this example, the user device 102 may determine one or more native apps (e.g., any of the native app(s) 130) that are each installed on the user device 102 and associated with a user account, in a similar manner as described above. The determined native apps associated with the user accounts may be referred to herein as user account information 136. The user device 102 (e.g. the search app 128) may have determined the native apps using the user account identification module 132. For example, the user account identification module 132 may have determined the native apps by detecting the user logging into the apps on the user device 102 using user login credentials 139. Alternatively, the user account identification module 132 may have determined the native apps by polling an OS 124 of the user device 102, or accessing another resource. In still other examples, the user device 102 may retrieve user login credentials 139 associated with the native apps (e.g., from a local location). The user device 102 may then determine the native apps by interacting (e.g., using the user account determination system 108) with one or more APIs (e.g., any of the API(s) 120-1 . . . 120-N) associated with the apps using the user login credentials 139. For example, the user device 102 may query the APIs using the user login credentials 139 to access or verify the user accounts associated with the native apps. In some examples, the user device 102 (e.g., the user account identification module 132) determines the native apps prior to, during (e.g., in response to), or following the user entering and/or the user device 102 transmitting the search query 134 to the search system 100.

Upon receiving the search results 138 from the search system 100, the user device 102 may display the search results 138 to the user based on the user account information 136. Specifically, the user device 102 may generate one or more user selectable links that include the AAMs, link data, and, e.g., accessibility data, included in the search results 138, in a similar manner as described above. In this example, the user device 102 may further filter or rank the search results 138 (e.g., the user selectable links) using the user account information 136, as described herein. The user device 102 may also arrange (e.g., further rank) the (e.g., filtered, or ranked) user selectable links as part of displaying the links to the user based on the result scores also included in the search results 138 (e.g., display higher-ranking links higher within a list of user selectable links), also in a similar manner as described above.

FIGS. 5A and 5B illustrate example app state records 148 that may be included in the search data store 112. FIG. 5A illustrates a general example of an app state record 148a. The app state record 148a of FIG. 5A includes information related to (e.g., specifying) an app state of a native app. As shown in FIG. 5A, the app state record 148a includes an app state ID 150, 150a that uniquely identifies the record 148a among other app state records included in the search data store 112. As also shown, the app state record 148a includes ASI 152, 152a (e.g., text) that describes the app state specified by the record 148a, and which may be used to identify the record 148a within the search data store 112. As further shown, the app state record 148a includes one or more AAMs 154, 154a that enable a user device 102 to access the app state specified by the record 148a within the native app. In this example, the app state record 148a may also include app state user account information 156, 156a indicating one or more user accounts (e.g., types thereof)

that may be required for a user device 102 to access the app state specified by the record 148a within the native app. In some examples, the app state record 148a also indicates whether the user device 102 may access the app state using the user accounts (e.g., user account types) free of charge or for a fee.

In some examples, the app state record 148a of FIG. 5A also includes information that describes values of one or more metrics associated with a person, place, or thing described in the record 148a. Example metrics include the popularity of a place described in the app state record 148a and/or ratings (e.g., user ratings) of the place. For example, if the app state record 148a describes a song, a metric associated with the song may be based on the popularity of the song and/or ratings (e.g., user ratings) of the song. The information included in the app state record 148a may also be based on measurements associated with the record 148a, such as how often the record 148a is retrieved during a search and how often user selectable links for any of the AAM(s) 154a of the record 148a are selected by a user. The information may also indicate whether the app state record 148a includes an AAM (e.g., one of the AAM(s) 154a) for a default app state, or a deeper app state, of the native app. In some examples, the search system 100 (e.g., the set processing module 146) uses this information to generate a result score for the app state record 148a (e.g., upon identifying the app state record 148a based on a search query 134 and as part of ranking the record 148a among other identified app state records), as described herein.

FIG. 5B illustrates a specific example of an app state record 148, 148b that specifies an app state of the native app "Netflix®" by Netflix, Inc. (hereinafter, "Netflix"). The app state specified by the app state record 148b of FIG. 5B corresponds to an entry within Netflix for the movie "Batman Returns" released in 1992. As shown in FIG. 5B, the app state record 148b includes an app state ID "Netflix—Batman Returns" 150, 150b that uniquely identifies the record 148b among other app state records included in the search data store 112. In other examples, the app state ID 150b may be a numeric value or have another (e.g., machine-readable) representation. As further shown, the app state record 148b includes ASI 152, 152b that describes the app state specified by the record 148b. As shown, the ASI 152b includes a description of the movie "Batman Returns," cast and production information, user reviews/ratings, and/or any other information (e.g., additional data fields) related to the movie or to the app state specified by the app state record 148b. In some examples, the ASI 152b also describes one or more functions provided by the app state, such as, e.g., "check show times," "buy tickets," "read user reviews," and "write a user review." As also shown, the app state record 148b further includes one or more AAMs 154,154b that enable a user device 102 to access the app state specified by the record 148b in Netflix. The app state record 148b of FIG. 5B also optionally includes app state user account information 156, 156b that indicates one or more user accounts (e.g., user account types) that are required for a user device 102 to access the app state specified by the record 148b within Netflix. In the example of FIG. 5B, the app state user account information 156b indicates both that a user account is required to access the app state and one or more specific user account types that will enable a user device 102 access to the state. In other examples, the app state user account information 156b may indicate only the user accounts and/or user account types that are required to access the app state.

Figure 6A:
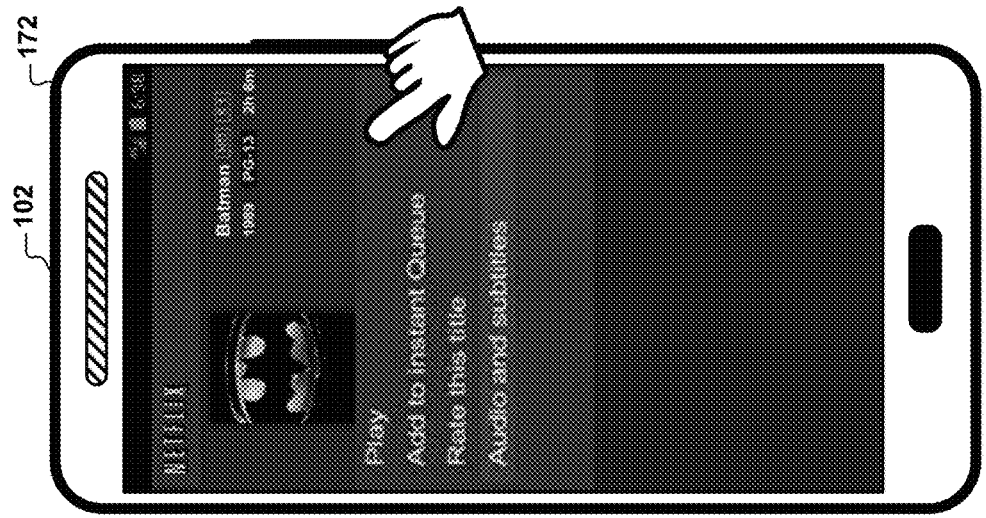
FIGS. 6A-8C depict example graphical user interfaces (GUIs) that may be generated on a user device according to the present disclosure.

FIGS. 6A-8C illustrate example GUIs that may be generated on a user device 102 according to the present disclosure. Specifically, the examples of FIGS. 6A-8C depict a user device 102 performing a search for app states of native apps based on a user-specified search query 134 and user account information 136 associated with the user device 102. As shown in FIG. 6A, a user of the user device 102 enters a search query "batman movie" 134 into (e.g., a search field 135 of) a GUI of a search app 128 executing on the user device 102. As also shown, the user further interacts with (e.g., a search button 137 of) the GUI to cause the search app 128 to transmit the search query 134 to a search system 100. In some examples, the user device 102 (e.g., the search app 128) also transmits user account information 136 indicating native apps installed on the user device 102 and associated with user accounts to the search system 100 (e.g., along with the search query 134). In other examples, the search system 100 may determine the user account information 136. In the above-described examples, the user account information 136 may indicate the native apps "Netflix" and "Amazon Instant Video®" by Amazon, Inc. (hereinafter, "Amazon Instant Video) that are each installed on the user device 102 and associated with an existing user account. In some examples, the user account information 136 also indicates the user accounts (e.g., the specific user account types) associated with these apps. In these examples, the user device 102 may also have the native app "Hulu®" by Hulu, Inc. (hereinafter, "Hulu") that does not require a user account installed on the user device 102.

Figure 6C:
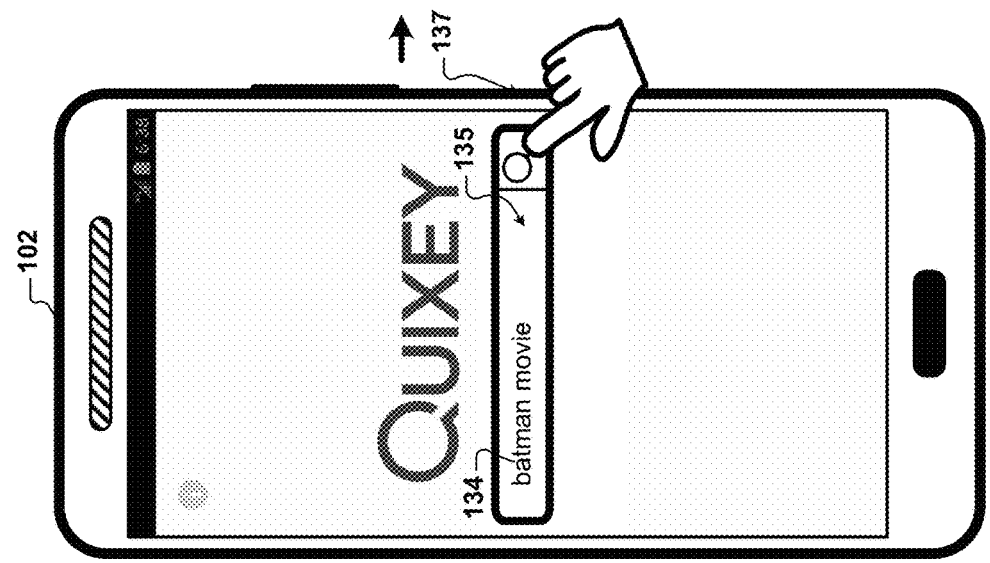

As shown in FIG. 6B, the user device 102 receives search results 138 from the search system 100 in response to transmitting the search query 134 and, e.g., the user account information 136, to the search system 100 and displays the search results 138 to the user as user selectable links 170-1 . . . 170-3 (collectively, the "links 170"). In the example of FIG. 6B, the search results 138 are responsive to the search query 134 (i.e., the text string "batman movie") and specify app states within Netflix, Amazon Instant Video, and Hulu. In other words, the app state specified by each search result 138 (e.g., by the AAM(s) included therein) is accessible within one of these native apps either using one of the associated user accounts or without a user account. In this example, the search system 100 may have generated each search result 138 by determining that the corresponding app state record 148a specifies an app state within one of Netflix, Amazon Instant Video, and Hulu (e.g., by determining that the state is accessible within one of these native apps using the (e.g., particular type of the) associated user account or no user account), as indicated by the user account information 136 and/or data stored in the user account data store 118. As shown in FIG. 6B, the user device 102 may arrange the links 170 using app headers 168-1 . . . 168-3 (collectively, the "headers 168") that indicate the corresponding native apps. As also shown, the user device 102 may further order the links 170 based on relevance of the corresponding ones of the search results 138 to the search query 134. Specifically, as shown in FIG. 6B, the user selectable link 170-1 (e.g., the corresponding search result 138) referencing the movie "Batman" may be more relevant to the search query "batman movie" 134 than the user selectable links 170-2 and 170-3 referencing the movies "Batman Returns" and "The Dark Knight," respectively. As further shown in FIG. 6B, the user may select (e.g., touch, or click on) one of the links 170 on the user device 102, namely the link 170-1 specifying an entry within Netflix for the movie "Batman." As shown in FIG. 6C, upon the user selecting the user selectable link 170-1, the user device 102 may launch Netflix and set Netflix into the app state specified by the link 170-1 (e.g., by an AAM included therein). In particular, the user device 102 may configure Netflix to display an entry 172 within Netflix for the movie "Batman." Upon the user device 102 setting Netflix into the app state (e.g., entry 172), the user may interact with the app state (e.g., cause Netflix to play the movie "Batman" on the user device 102).

Figure 7A:
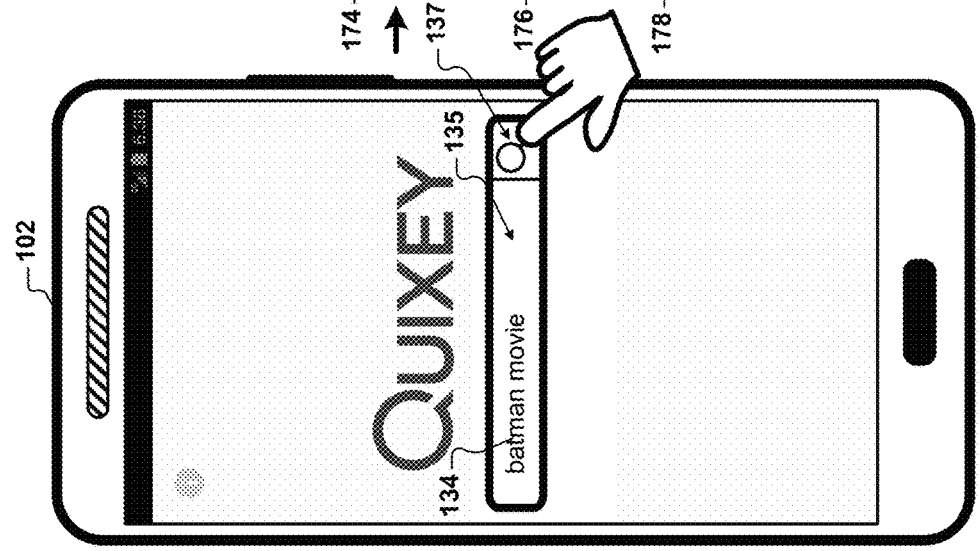

FIG. 7A is analogous to FIG. 6A described above. In the example of FIGS. 7A-7C, the user account information 136 may once again indicate Netflix and Amazon Instant Video that are installed on the user device 102 and associated with user accounts. In this example, the user account information 136 may also indicate the user accounts, e.g., a user account type associated with each of Netflix and Amazon Instant Video. For example, the user account information 136 may indicate a Netflix user account that allows access to all entries within Netflix. The user account information 136 may further indicate an Amazon Instant Video user account that allows access to some entries within Amazon Instant Video free of charge and access to other entries for a fee. Also in this example, the user device 102 may have Hulu that does not require a user account installed on the user device 102, in a similar manner as described above.

FIG. 7B depicts search results 138 received by the user device 102 from the search system 100 in response to transmitting the search query 134 and, e.g., the user account information 136, to the search system 100. In this example, the search system 100 may have generated each search result 138 by determining that the corresponding app state record 148a specifies an app state (e.g., that is accessible using the associated user account) within one of Netflix, Amazon Instant Video, and Hulu, in a similar manner as described above. As shown in FIG. 7B, the user device 102 displays the search results 138 to the user as user selectable links 170-2, 170-4, and 170-5 (collectively, the "links 170"). In this example, the search results 138 are responsive to the search query 134 and specify app states that are accessible within Netflix, Amazon Instant Video, and Hulu either using the associated user accounts or without a user account. As also shown, the user device 102 may display the links 170 such that one or more of the links 170 each indicate to the user (e.g., via any of GUI elements 174, 176, and 178) whether the corresponding app state, or entry, within Netflix, Amazon Instant Video, or Hulu is accessible on the user device 102 free of charge or for a fee. For example, the user device 102 may determine whether the app states are accessible within these native apps free of charge or for a fee using additional data received from the search system 100 as part of the search results 138 (e.g., selected from the corresponding app state records 148a and/or retrieved from the user account data store 118), or determined by the user device 102. For example, the search system 100 may generate this additional data using the user accounts, e.g., the user account types, associated with Netflix and Amazon Instant Video, as indicated by the user account information 136. In the example of FIG. 7B, the user device 102 may further order the links 170 based on whether the corresponding app states are accessible within the native apps free of charge or for a fee. For example, as shown, the user device 102 may display the user selectable link 170-4 referencing the movie "Batman" and allowing access to the corresponding app state in Netflix free of charge higher within a list than the user selectable link 170-5 referencing the same movie, but requiring a fee to access the corresponding app state in Amazon Instant Video. As further shown, in some examples, the user device 102 also arranges the links 170 using the app headers 168 and/or order the links 170 based on relevance of the corresponding ones of the search results 138 to the search query 134, in a similar manner as described above.

As shown in FIG. 7B, the user may select the user selectable link 170-4 specifying an entry within Netflix for the movie "Batman," which is accessible on the user device 102 free of charge given the associated user account. As shown in FIG. 7C, upon the user selecting the user selectable link 170-4, the user device 102 may launch Netflix and set Netflix into the app state specified by the link 170-4 (e.g., access the entry 172 in Netflix for the movie "Batman"). Upon the user device 102 setting Netflix into the app state, the user may interact with the app state.

Figure 8A:
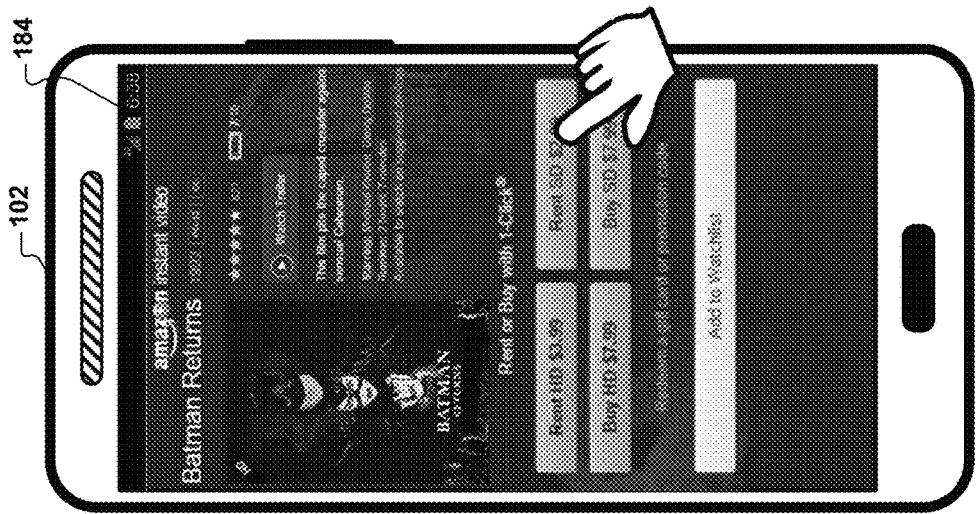
Figure 8B:
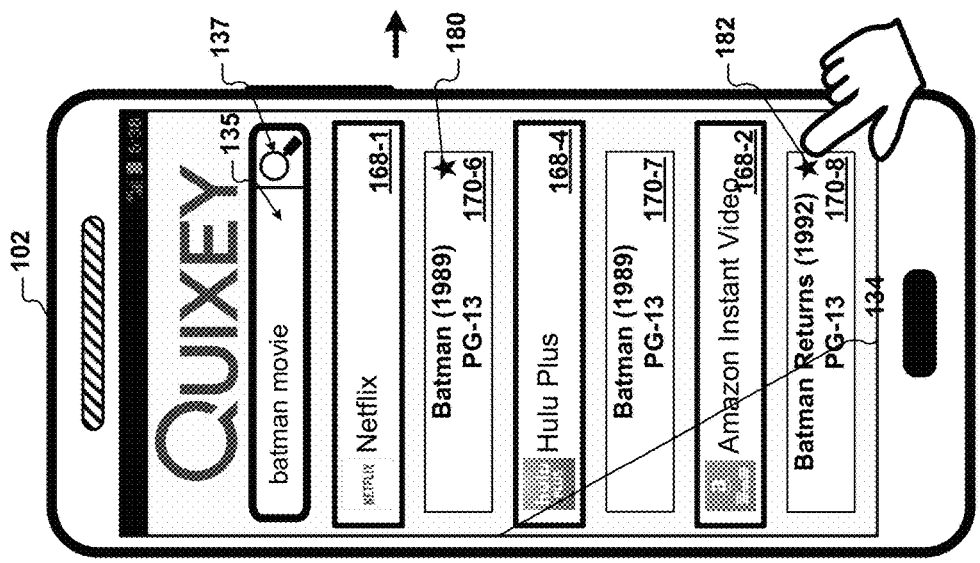
Figure 8C:
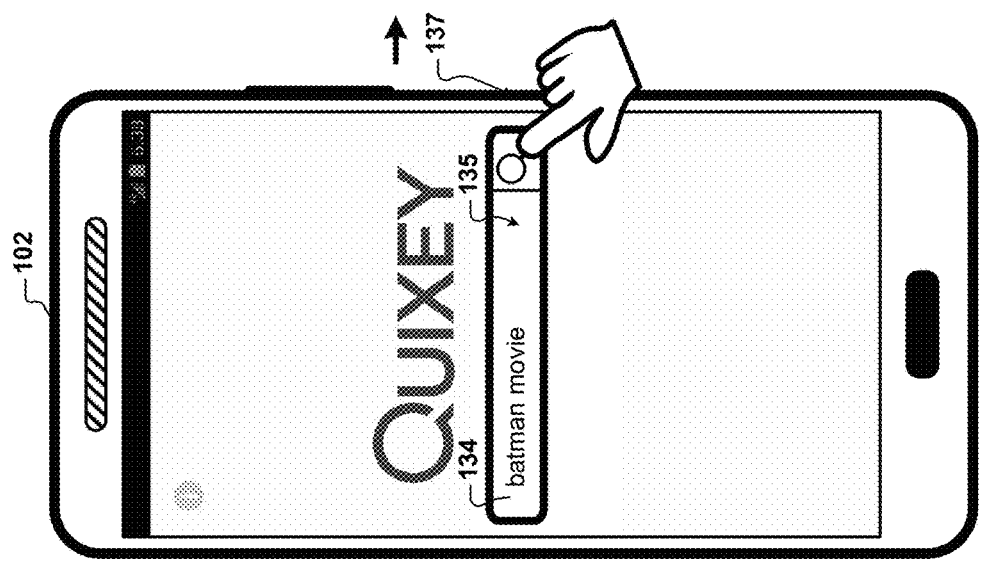

FIG. 8A is analogous to FIGS. 6A and 7A described above. In the example of FIGS. 8A-8C, the user account information 136 may once again indicate Netflix and Amazon Instant Video that are installed on the user device 102 and associated with user accounts (and, e.g., the user accounts themselves, or types thereof). In some examples, the user device 102 also has a native app "Hulu Plus®" by Hulu, Inc. (hereinafter, "Hulu Plus") installed on the user device 102. For example, Hulu Plus may require a user account for the user device 102 to access app states within Hulu Plus. In these examples, although installed on the user device 102, Hulu Plus may not be associated with such a user account. In other examples, the user device 102 may not have Hulu Plus installed on the user device 102. In any case, in the example of FIGS. 8A-8C, the user device 102 may not have access to app states within Hulu Plus.

FIG. 8B shows search results 138 received by the user device 102 from the search system 100 in response to transmitting the search query 134 and, e.g., the user account information 136, to the search system 100. As shown in FIG. 8B, the user device 102 displays the search results 138 to the user as user selectable links 170-6, 170-7, and 170-8 (collectively, the "links 170"). In this example, the search results 138 are responsive to the search query 134 and specify app states that are accessible within Netflix and Amazon Instant Video using the associated user accounts. The search results 138 also specify an app state within Hulu Plus that is not both installed on the user device 102 and associated with a user account. In other words, the user device 102 may not be able to access the app state within Hulu Plus. In some examples (not shown), the search results 138 further specifies one or more app states that are accessible within other native apps (e.g., Hulu) by the user device 102 without the use of user accounts.

In this example, each search result 138 may be associated with a result score generated by the search system 100 based on whether the corresponding app state record 148a specifies an app state within any of Netflix and Amazon Instant Video (e.g., based on whether the state is accessible within any of these native apps using the associated user account), as indicated by the user account information 136. As shown in FIG. 8B, the user device 102 may display the links 170 generated for the search results 138 by ranking (e.g., ordering) each link 170 based on the corresponding result score. For example, as shown, the user device 102 may display the user selectable link 170-6 referencing the movies "Batman" and allowing access to the corresponding app state in Netflix higher within a list than the user selectable link 170-7 referencing the same movie, but not allowing access to the corresponding app state in Hulu Plus. As also shown, the user device 102 may display the links 170 such that one or more of the links 170 each indicate to the user (e.g., via any of GUI elements 180 and 182) whether the corresponding app state within Netflix, Amazon Instant Video, or Hulu Plus is accessible on the user device 102. For example, the user device 102 may generate the links 170 to include accessibility data received from the search system 100 as part of the search results 138 (e.g., determined by the system 100 using the corresponding app state records 148a and the user account information 136), or determined by the user device 102. As further shown, in some examples, the user device 102 also arranges the links 170 using app headers 168-1, 168-2, and 168-4 and/or order the links 170 based on relevance of the corresponding ones of the search results 138 to the search query 134, in a similar manner as described above.

As shown in FIG. 8B, the user may select the user selectable link 170-8 specifying an entry within Amazon Instant Video for the movie "Batman Returns," which is accessible on the user device 102 for a fee given the associated user account. As shown in FIG. 8C, upon the user selecting the user selectable link 170-8, the user device 102 may launch Amazon Instant Video and set Amazon Instant Video into the app state specified by the link 170-8 (e.g., access the entry 184 in Amazon Instant Video for the movie "Batman Returns"). Upon the user device 102 setting Amazon Instant Video into the app state, the user may interact with the app state.

Figure 9A:
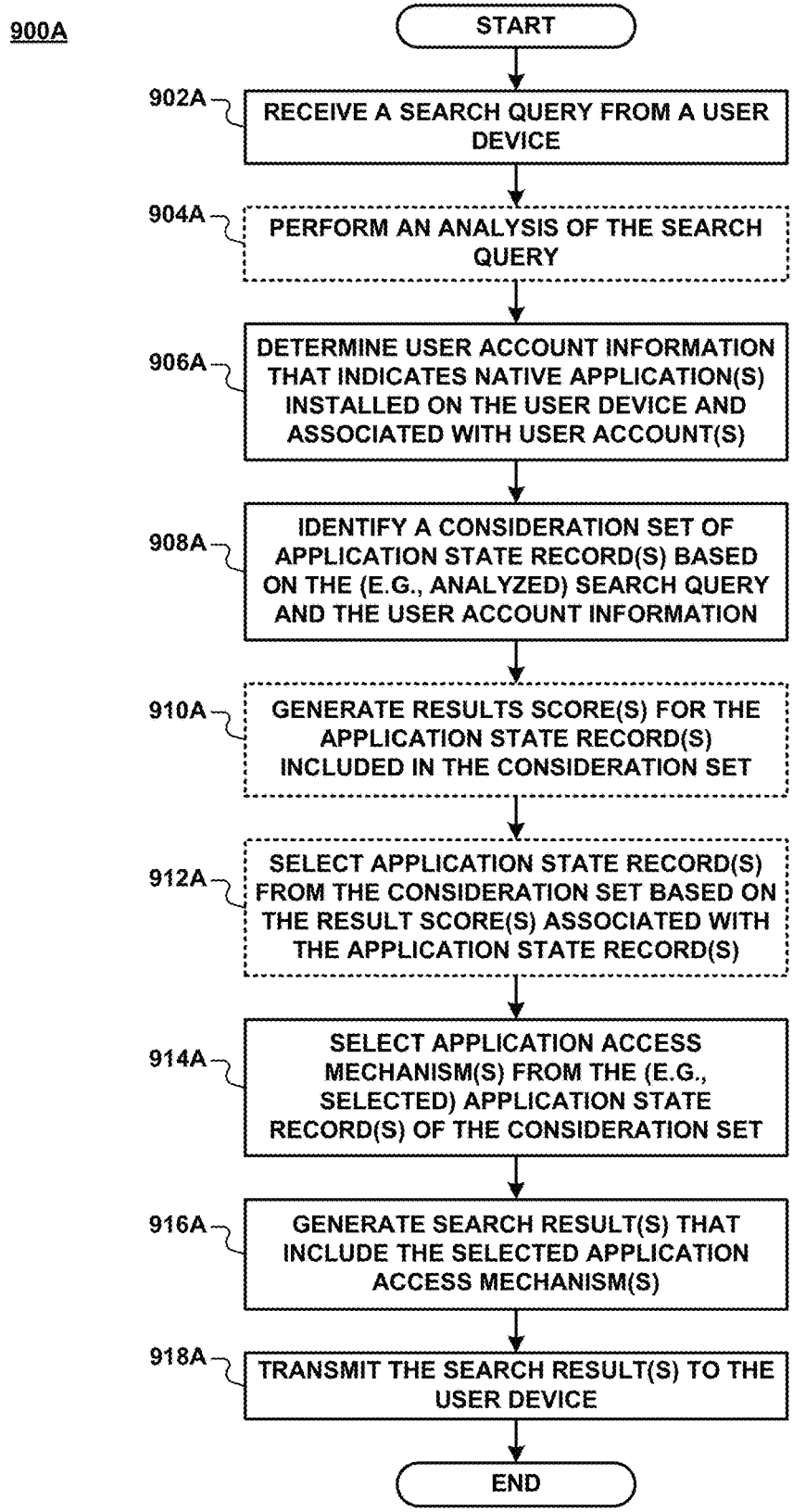
FIGS. 9A-9B are flow diagrams illustrating example methods for generating search results based on a search query and user account information at a search system.
Figure 9B:
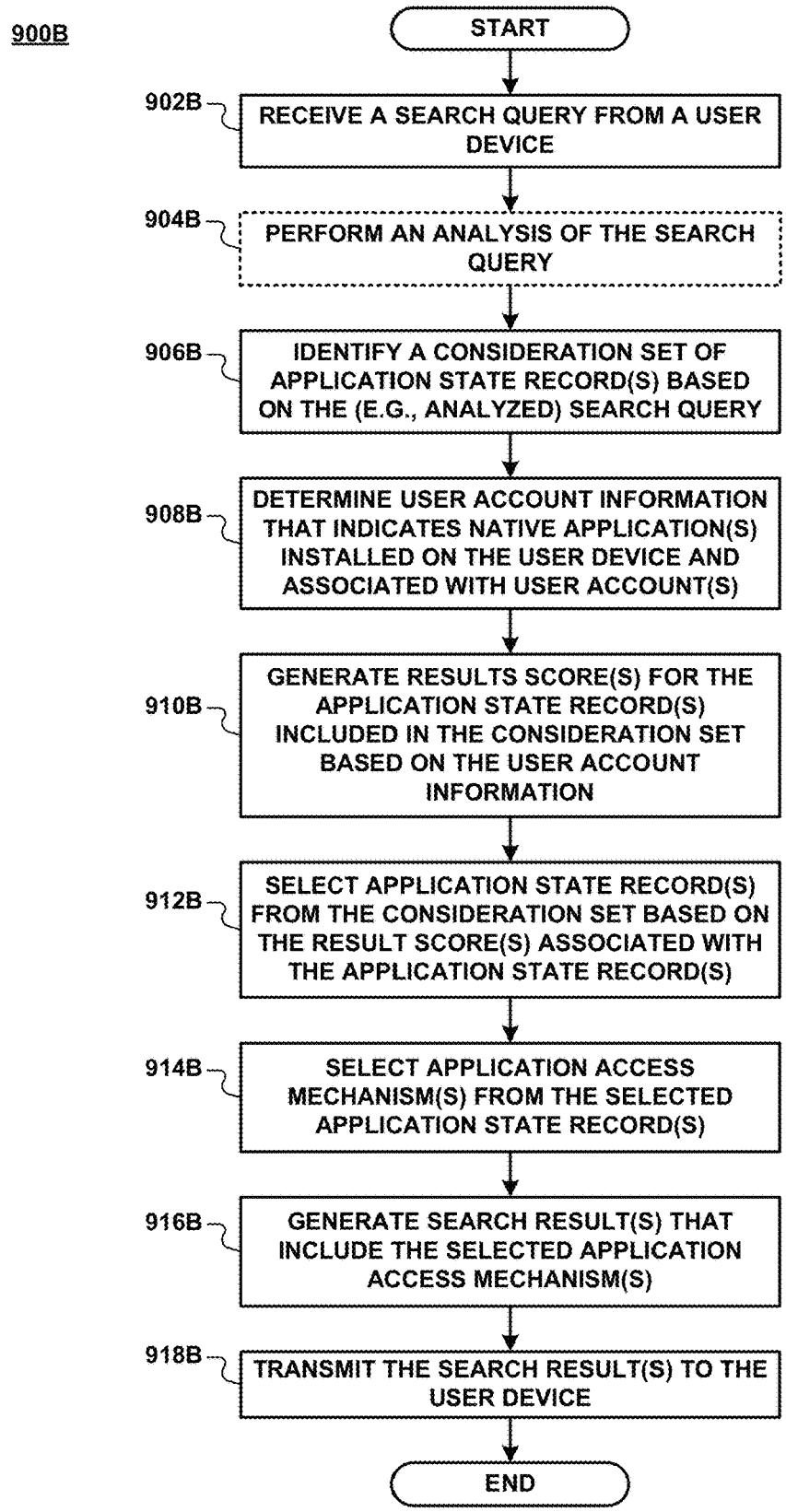

FIGS. 9A and 9B are flow diagrams that illustrate example methods for generating app state search results 138 at a search system 100 based on a search query 134 received from a user device 102 and based on user account information 136 determined by the search system 100. FIG. 9A illustrates an example method 900A for generating the search results 138 by filtering one or more app state records 148a identified using the search query 134 based on the user account information 136. FIG. 9B illustrates an example method 900B for generating the search results 138 by ranking the app state record(s) 148a based on the user account information 136.

With reference to FIG. 9A, in block 902A, the search system 100 may initially receive a search query 134 specified by a user from a user device 102 (e.g., as part of a query wrapper). In block 904A, the search system 100 (e.g., the query analysis module 142) may optionally perform an analysis of the search query 134 (e.g., perform any of tokenization, filtering, stemming, synonymization, and stop word removal with respect to the search query 134). In block 906A, the search system 100 may determine user account information 136 that indicates one or more native apps that are each installed on the user device 102 and associated with a user account. As described herein, the user accounts associated with the native apps may be associated with a user of the user device 102 on which the native apps are installed. As one example, the search system 100 may receive the user account information 136 from the user device 102 (e.g., also as part of the query wrapper, or separately from the search query 134). As another example, the search system 100 may receive the user account information 136 from the user account determination system 108. In this example, the user account determination system 108 may generate the user account information 136 using data received from the user device 102 (e.g., user login credentials 139 associated with the native apps) and/or the API(s) 120 (e.g., by querying the API(s) 120 using the credentials 139), as described herein. Alternatively, the user account determination system 108 may generate the user account information 136 independently of other systems or devices (e.g., using data stored in the user account data store 118), as also described herein. In some examples, the search system 100 receives other information from the user device 102 (e.g., as part of the query wrapper, or separately), such as user information and/or geo-location, platform, and IP address information associated with the user device 102.

In block 908A, the search system 100 (e.g., the set generation module 144) may identify a consideration set of one or more app state records 148a included in the search data store 112 based on the (e.g., analyzed) search query 134 and based on the user account information 136. In this example, each identified app state record 148a may specify an app state of a native app. The search system 100 (e.g., the set generation module 144) may identify the app state records 148a based on matches between terms of the search query 134 and terms of information (e.g., app state IDs 150a and/or ASI 152a) included in the records 148a. To identify the app state records 148a of the consideration set based on the user account information 136, the search system 100 (e.g., the set generation module 144) may use any of a variety of techniques.

As one example, the search system 100 (e.g., the set generation module 144) may identify the app state records 148a of the consideration set based on matches between the user account information 136 and one or more native apps referenced in the records 148a. For example, the search system 100 may identify the app state records 148a such that each record 148a both matches the search query 134, as described above, and includes any of an app state ID 150a, ASI 152a, and an AAM 154a that reference one of the native apps associated with the user accounts, as indicated by the user account information 136. As another example, one or more app state records 148a included in the search data store 112 may each include app state user account information 156a that indicates whether the app state specified by the respective record 148a requires a user account (e.g., a specific user account type) for a user device 102 to access the state within the corresponding native app (e.g., as shown in FIG. 5A). In this example, the search system 100 (e.g., the set generation module 144) may identify the app state records 148a of the consideration set based on matches between the user account information 136 and the app state user account information 156a specified by the records 148a. In other words, the search system 100 may identify the app state records 148a such that each record 148a both matches the search query 134, as described above, and indicates that the user device 102 is able to access the app state specified by the record 148a given the user account information 136. For example, each identified app state record 148a may indicate that the app state specified by the record 148a requires one of the user accounts (e.g., types) indicated by the user account information 136.

In the examples described above, the consideration set may further include one or more app state records 148, 148a that each match the search query 134, as described above, and reference (e.g., via an app state ID 150a, ASI 152a, or an AAM 154a) a native app that does not require a user account, as described herein. For example, the search system 100 may identify these additional app state records 148a using data (e.g., a list of one or more native apps) included in the user account data store 118 that indicates that the corresponding native apps do not require user account for a user device 102 to access app states within the apps.

In blocks 910A-912A, the search system 100 (e.g., the set processing module 146) may optionally process the consideration set of app state records 148a. Specifically, in block 910A, the search system 100 may generate one or more result scores for the app state records 148a included in the consideration set. For example, the search system 100 may generate a result score for each app state record 148a included in the consideration set. In block 912A, the search system 100 may select one or more (e.g., a subset of the) app state records 148a from the consideration set based on the one or more result scores associated with the selected records 148a. For example, the search system 100 may select one or more app state records 148a having the highest (e.g., largest) one or more result scores. In any case, in block 914A, the search system 100 (e.g., the search result generation module 114) may select one or more AAMs from the (e.g., selected) app state records 148a of the consideration set. For example, the search system 100 may select one or more AAMs from each (e.g., selected) app state record 148a. In some examples, the search system 100 also selects other information from the (e.g., selected) app state records 148a, such as result scores, link data, and/or accessibility data associated with the records 148a. In block 916A, the search system 100 (e.g., the search result generation module 114) may generate one or more search results 138 that include the selected AAMs. For example, the search system 100 may generate the search results 138 such that each search result 138 includes one or more AAMs (and, e.g., other information) selected from each (e.g., selected) app state record 148a of the consideration set. In block 918A, the search system 100 (e.g., the search result generation module 114) may transmit the search results 138, including the selected AAMs, to the user device 102 that generated the search query 134.

With reference to FIG. 9B, blocks 902B and 904B are analogous to blocks 902A and 904A described above. In block 906B, the search system 100 (e.g., the set generation module 144) may identify a consideration set of one or more app state records 148a included in the search data store 112 based on the (e.g., analyzed) search query 134. In this example, each identified app state record 148a may specify an app state of an app, as described herein. For example, the search system 100 (e.g., the set generation module 144) may identify the app state records 148a based on matches between terms of the search query 134 and terms of information (e.g., app state IDs 150a and/or ASI 152a) included in the records 148a, as also described herein. In block 908B, the search system 100 may determine user account information 136, in a similar manner as described above. For example, the search system 100 may receive the user account information 136 from the user device 102 or from the user account determination system 108, as described herein. For instance, the user account determination system 108 may generate the user account information 136 using data received from the user device 102 and/or the API(s) 120, or independently of other systems or devices, as also described herein. The search system 100 may also receive other information from the user device 102, such as user information and/or geo-location, platform, and IP address information associated with the user device 102, as also previously described.

In blocks 910B and 912B, the search system 100 (e.g., the set processing module 146) may process the consideration set of app state records 148a. In particular, in block 910B, the search system 100 may generate a result scores for each app state record 148a included in the consideration set based on the user account information 136. For example, the search system 100 may generate each result score using the user account information 136 as (e.g., part of) a scoring feature in conjunction with a machine-learned regression model, as described herein. As a specific example, the search system 100 may generate each result score based on whether the app state specified by the corresponding app state record 148a is accessible within the associated native app, as indicated by the user account information 136. In some examples, the search system 100 further generates each result score based on one or more additional scoring features, such as record, query, and/or record-query scoring features, as also described herein.

In any case, in block 912B, the search system 100 (e.g., the set processing module 146) may select one or more (e.g., highest-ranking) app state records 148a from the consideration set based on the one or more result scores associated with the selected records 148a, in a similar manner as described above. In block 914B, the search system 100 (e.g., the search result generation module 114) may select one or more AAMs from the selected app state records 148a, e.g., along with other information, such as result scores, link data, and/or accessibility data associated with the records 148a, as described herein. In block 916B, the search system 100 may generate one or more search results 138 that include the selected AAMs and, in block 918B, transmit the search results 138, including the selected AAMs, to the user device 102 that generated the search query 134, as also described herein.

Figure 10A:
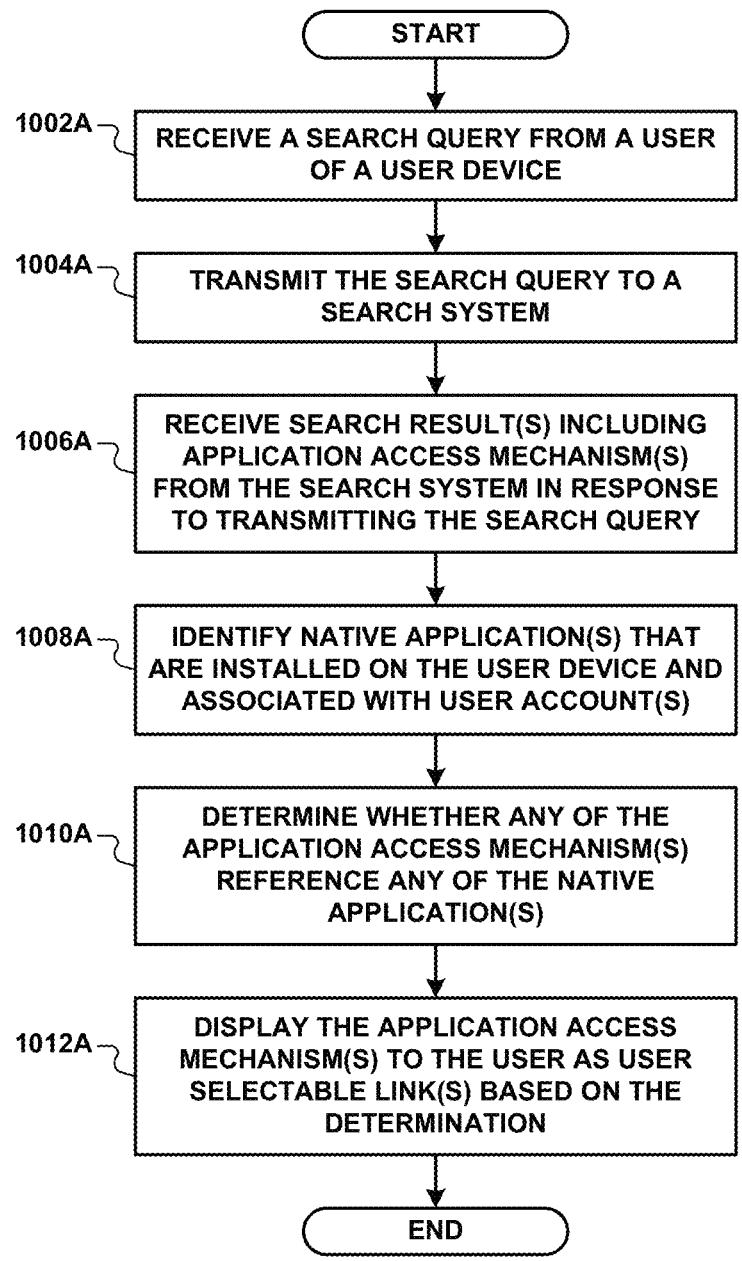
FIGS. 10A-10B are flow diagrams illustrating example methods for generating search results based on a search query and user account information at a user device.

FIG. 10A is a flow diagram that illustrates an example method 1000A for generating app state search results 138 at a user device 102 based on a user-specified search query 134 and user account information 136 associated with the user device 102. As shown in FIG. 10A, in block 1002A, the user device 102 may receive a search query 134 (e.g., a text string) from a user of the user device 102. For example, the user device 102 may receive the search query 134 via a search app 128 executing on the user device 102 (e.g., via a GUI of the search app 128). In block 1004A, the user device 102 may transmit the search query 134 to the search system 100 (e.g., as part of a query wrapper). In this example, the search system 100 may receive the search query 134 from the user device 102 and generate one or more search results 138 based on the search query 134. As described herein, the search results 138 may include one or more AAMs, result scores, link data, and/or accessibility data. The search system 100 may then transmit the search results 138 to the user device 102. As also shown in FIG. 10A, in block 1006A, the user device 102 may receive the search results 138, including the AAM(s), from the search system 100 in response to transmitting the search query 134 to the search system 100.

In block 1008A, the user device 102 may identify one or more native apps (e.g., any of the native app(s) 130) that are each installed on the user device 102 and associated with a user account (e.g., user account information 136), in a similar manner as described above. As described herein, the user device 102 (e.g. the search app 128) may identify the native apps associated with the user accounts using the user account identification module 132 (e.g., by detecting the user logging into the apps on the user device 102, polling the OS 124, accessing another resource, or interacting with APIs using user login credentials 139). In block 1010A, the user device 102 may determine whether any of the AAM(s) included in the search results 138 reference any of the identified native apps. For example, an AAM included in the search results 138 referencing one of the identified native apps associated with the user accounts may indicate that the user device 102 may access the app state specified by the AAM within the native app installed on the user device 102. In block 1012A, the user device 102 may display the AAM(s) included in the search results 138 to the user as one or more user selectable links based on the above-described determination. For example, each user selectable link may include one or more of the AAM(s) and, e.g., the corresponding link and/or accessibility data also received as part of the search results 138. As one example, the user device 102 may filter the search results 138 based on the determination by displaying only those of the AAM(s) that specify app states within the identified native apps as user selectable links. For example, the user device 102 may select only those of the AAM(s) that specify app states that are accessible within the identified native apps using the (e.g., particular types of the) associated user accounts. In other examples, the user device 102 may rank the search results 138 based on the determination by generating a result score for each AAM based on whether the AAM specifies an app state within any of the identified native apps. For example, the user device 102 may generate the result score based on whether the app state is accessible within any of the identified native apps using any of the associated user accounts. In some examples, the user device 102 generates the result score for the AAM based on the corresponding result score received as part of the search results 138.

Figure 10B:
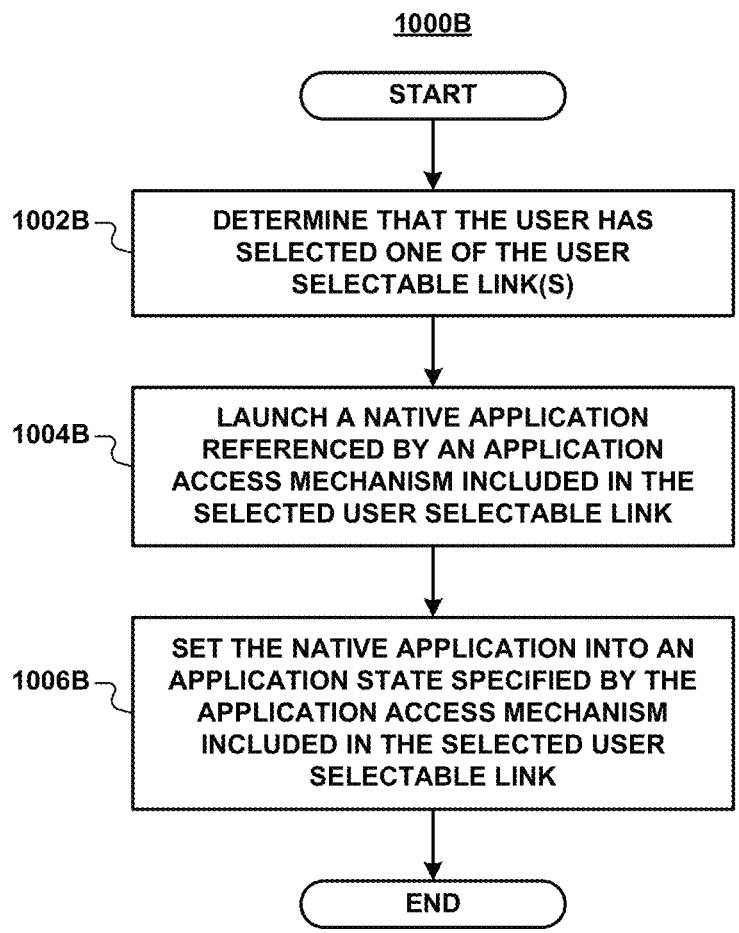

FIG. 10B is a flow diagram that illustrates an example method 1000B for performing example actions in response to a user of a user device 102 interacting with app state search results 138 displayed to the user on the user device 102. As shown in FIG. 10B, in block 1002B, the user device 102 may initially determine (e.g., detect) that the user has selected one of the user selectable links displayed to the user as described above with reference to FIG. 10A. As also shown, in block 1004B, in response to detecting the user selection, the user device 102 may launch a native app referenced by the selected user selectable link (e.g., by an AAM included in the link). As further shown, in block 1006B, upon launching the native app, the user device 102 may set the app into an app state specified by the selected user selectable link (e.g., by the AAM). In these examples, upon setting the native app into the app state, the user may interact with (e.g., preview, or perform a function provided by) the app state on the user device 102.

In additional examples (not shown), the techniques disclosed herein may include one or more of the following features. As one example, a user device 102 may include one or more native apps that are not installed on the user device 102, but which are associated with user accounts that are, in turn, associated with a user of the user device 102. For example, the user may have initially obtained (e.g., registered for and/or purchased) the user accounts associated with the native apps. In some examples, the user does not install the native apps on the user device 102. In other examples, the user may have installed the native apps on the user device 102 and subsequently uninstalled the apps. In any case, in this example, a system or device (e.g., the user device 102, the user account determination system 108, the search system 100, and/or another system or device) may store an indication of the user accounts associated with the native apps that are not installed on the user device 102 (e.g., user account information 136). Also in this example, the search system 100 may generate app state search results 138 based on a user-specified search query 134 and the user account information 136, in a similar manner as described above. For example, each search result 138 may include an AAM that specifies an app state of a native app, as described above, and an app download address (ADA) that specifies a location (e.g., a digital distribution platform, such as the Play Store® by Google Inc.) where the user device 102 may download the native app referenced by the AAM. Upon receiving the search result 138 from the search system 100, the user device 102 may generate a user selectable link that includes the AAM and the ADA and display the link to the user. In response to the user selecting the user selectable link on the user device 102, the user device 102 may download the native app using the ADA, install the app, launch the app, and set the app into the app state specified by the AAM, in a similar manner as described herein.

In some examples, one or more of the search results 138 each include a web access mechanism (WAM) that specifies an app state of a web-based app that is equivalent (e.g., analogous) to the app state specified by the AAM included in the result 138. Upon receiving such a search result 138 from the search system 100, the user device 102 may generate a user selectable link that includes the AAM and the WAM and display the link to the user. In response to the user selecting the user selectable link on the user device 102, the user device 102 may launch the web browser app 126 and access the equivalent app state of the web-based app using the WAM. The WAM may include a resource identifier that references a web resource (e.g., a page of the web-based app, or website). For instance, the WAM may include a uniform resource locator (URL) (i.e., a web address) used with the hypertext transfer protocol (HTTP). Upon the user selecting the user selectable link including the WAM, the user device 102 may launch the web browser app 126 and retrieve the web resource referenced by the resource identifier (e.g., access the app state, or page, of the web-based app, or website, specified by the WAM).

In still other examples, the search system 100 may generate one or more additional search results (not shown) that include content that is not associated with app states of native apps (e.g., content related to native apps, web sites, documents, and/or media files). In these examples, the search system 100 may identify one or more records (e.g., app records, or other data structures) stored in a data store that include the content based on the search query 134, in a similar manner as described above. The search system 100 may select the content from the identified records and transmit the content to the user device 102 with the search results 138.

The modules and data stores included in the search system 100 and user account determination system 108 represent features that may be included in these systems 100, 108 as they are described in the present disclosure. For example, the search module 110, search result generation module 114, and search data store 112 may represent features included in the search system 100. Similarly, the user account determination module 116 and user account data store 118 may represent features included in the user account determination system 108. The modules and data stores described herein may be embodied by electronic hardware, software, firmware, or any combination thereof. Depiction of different features as separate modules and data stores does not necessarily imply whether the modules and data stores are embodied by common or separate electronic hardware, software, or firmware components. In some implementations, the features associated with the modules and data stores depicted herein are realized by common or separate electronic hardware, software, and/or firmware components.

The modules and data stores may be embodied by electronic hardware, software, and/or firmware components, including one or more processing units, one or more memory components, one or more input/output (I/O) components, and interconnect components. The interconnect components may be configured to provide communication between the processing units, memory components, and I/O components. For example, the interconnect components may include one or more buses configured to transfer data between electronic components. The interconnect components may also include control circuits (e.g., a memory controller and/or an I/O controller) configured to control communication between electronic components.

The processing units may include one or more central processing units (CPUs), graphics processing units (GPUs), digital signal processing units (DSPs), or other processing units. The processing units may be configured to communicate with the memory components and I/O components. For example, the processing units may be configured to communicate with the memory components and I/O components via the interconnect components.

A memory component, or memory, may include any volatile or non-volatile media. For example, the memory may include electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDDs), solid state drives (SSDs), magnetic tape drives, optical storage technology (e.g., compact disc, digital versatile disc, and/or Blu-ray disc), or any other memory components.

The memory components may include (e.g., store) the data described herein. For example, the memory components may include the data included in the app state record(s) 148a of the search data store 112 and/or the data included in any of the user account data store 118 and API data store(s) 122. The memory components may also include instructions that may be executed by the processing units. For example, the memory components may include computer-readable instructions that, when executed by the processing units, cause the processing units to perform the various functions attributed to the modules and data stores described herein.

The I/O components may refer to electronic hardware, software, and/or firmware providing communication with a variety of different devices. For example, the I/O components may provide communication between other devices and the processing units and memory components. In some examples, the I/O components are configured to communicate with a computer network. For example, the I/O components may be configured to exchange data over a computer network using a variety of different physical connections, wireless connections, and protocols. The I/O components may include network interface components (e.g., a network interface controller), repeaters, network bridges, network switches, routers, and firewalls. In some examples, the I/O components includes hardware, software, and/or firmware configured to communicate with various human interface devices, including display screens, keyboards, pointer devices (e.g., a mouse), touchscreens, speakers, and microphones. In some examples, the I/O components includes hardware, software, and/or firmware configured to communicate with additional devices, such as external memory (e.g., external HDDs).

In some implementations, the search system 100 and/or user account determination system 108 is a system of one or more computing devices (e.g., a computer search system) configured to implement the techniques described herein. Put another way, the features attributed to the modules and data stores described herein may be implemented by one or more computing devices. Each computing device may include any combination of electronic hardware, software, and/or firmware described above. For example, each computing device may include any combination of the processing units, memory components, I/O components, and interconnect components described above. The computing devices may also include various human interface devices, including display screens, keyboards, pointing devices (e.g., a mouse), touchscreens, speakers, and microphones. The computing devices may also be configured to communicate with additional devices, such as external memory (e.g., external HDDs).

The computing devices of the search system 100 and/or user account determination system 108 may be configured to communicate with the network 106. The computing devices may also be configured to communicate with one another via a computer network. In some examples, the computing devices include one or more server computing devices configured to communicate with the user device(s) 102 (e.g., receive search queries 134 and user account information 136 and transmit search results 138), gather data from the data source(s) 104, index the data, store the data, and store other documents. In some examples, the computing devices resides within one or more machines at a single geographic location. In other examples, the computing devices may be distributed across a number of geographic locations.

Additionally, the various implementations of the search system 100 and user account determination system 108 described above (e.g., using one or more computing devices that include one or more processing units, memory components, I/O components, and interconnect components) are equally applicable to any of the user device(s) 102, as well as to the various components thereof, as described herein.

What is claimed is:

1. A method comprising:
    transmitting, using a user device, a search query to a search system configured to generate search results in response to a received search query;
    receiving the search results from the search system at the user device in response to transmitting the search query, wherein the search results include one or more application (app) access mechanisms (AAMs) that each reference a native app and indicate one or more operations for the native app to perform;
    identifying, using the user device, one or more native apps that are each installed on the user device and associated with a user account, wherein the user account is associated with a user of the user device and the user account is identified by receiving from a data store external to the user device, or by querying one or more app program interfaces (APIs);
    identifying, using the user device, whether each of the one or more AAMs included in the search results reference any of the one or more native apps associated with the user account; and
    displaying at least one of the one or more native apps which is referenced by at least one of the one or more AAMs at the user device based on the identification,
    wherein the identifying of the one or more native apps that are each installed on the user device and associated with the user account comprises identifying one or more user accounts associated with the one or more native apps,
    wherein the identification of whether each of the one or more AAMs reference any of the one or more native apps associated with the user account comprises identifying at least one AAM among the one or more AAMs specifying app states that are accessible by any of the one or more native apps using the one or more user accounts,
    wherein the identification of the one or more user accounts associated with the one or more native apps comprises one of:
        receiving an indication of the one or more user accounts from the data store, and querying the one or more APIs associated with the one or more native apps using user login credentials associated with the one or more native apps, and identifying the one or more user accounts based on querying the one or more APIs, and wherein the displaying of at least one of the one or more native apps which is referenced by at least one of the one or more AAMs based on the identification of whether each of the one or more AAMs included in the search results reference any of the one or more native apps associated with the user account comprises:

generating, using the user device, at least one user selectable link that includes at least one of the one or more AAMs that references any of the one or more native apps, respectively, and displaying the at least one user selectable link relatively higher within a list on the user device, and generating, using the user device, one or more user selectable link that includes at least one of the one or more AAMs that does not reference any of the one or more native apps, respectively, and displaying the one or more user selectable link relatively lower within the list on the user device.

2. The method of claim 1, wherein the identifying of the one or more native apps that are each installed on the user device and associated with a user account comprises one of:

querying an operating system of the user device;

querying the one or more APIs associated with the one or more native apps using user login credentials associated with the one or more native apps, and identifying the one or more user accounts associated with the one or more native apps based on querying the one or more APIs; and retrieving an indication of the one or more native apps from the data store.

3. The method of claim 1, further comprising:

identifying, using the user device, accessibility data that indicates whether each of the one or more AAMs included in the search results specifies an app state that is accessible within any of the one or more native apps using the one or more user accounts, and wherein the at least one user selectable link further comprises the accessibility data.

4. A user device comprising:

at least one processor configured to:

transmit a search query to a search system configured to generate search results in response to a received search query, receive the search results from the search system in response to transmitting the search query, wherein the search results include one or more application (app) access mechanisms (AAMs) that each reference a native app and indicate one or more operations for the native app to perform, identify one or more native apps that are each installed on the user device and associated with a user account, wherein the user account is associated with a user of the user device and the user account is identified by receiving from a data store external to the user device, or by querying one or more app program interfaces (APIs), identify whether each of the one or more AAMs included in the search results reference any of the one or more native apps associated with the user account, and display at least one of the one or more native apps which is referenced by at least one of the one or more AAMs based on the identification, wherein the identifying of the one or more native apps that are each installed on the user device and associated with the user account comprises identifying one or more user accounts associated with the one or more native apps, wherein the identification of whether each of the one or more AAMs reference any of the one or more native apps associated with the user account further comprises identifying at least one AAM among the one or more AAMs specifying app states that are accessible by any of the one or more native apps using the one or more user accounts, wherein the identification of the one or more user accounts associated with the one or more native apps comprises one of:

receiving an indication of the one or more user accounts from the data store, querying the one or more APIs associated with the one or more native apps using user login credentials associated with the one or more native apps, and identifying the one or more user accounts based on querying the one or more APIs, and wherein the displaying of at least one of the one or more native apps which is referenced by at least one of the one or more AAMs based on the identification of whether each of the one or more AAMs included in the search results reference any of the one or more native apps associated with the user account comprises:

generating, using the user device, at least one user selectable link that includes at least one of the one or more AAMs that references any of the one or more native apps, respectively, and displaying the at least one user selectable link relatively higher within a list on the user device, and generating, using the user device, one or more user selectable link that includes at least one of the one or more AAMs that does not reference any of the one or more native apps, respectively, and displaying the one or more user selectable link relatively lower within the list on the user device.

* * * * *